US012755396B2

(12) United States Patent
Harada

(10) Patent No.: US 12,755,396 B2
(45) Date of Patent: Oct. 6, 2026

(54) WORK MANAGEMENT DEVICE, WORK MANAGEMENT METHOD, AND WORK-IN-PROGRESS ESTIMATION MODEL

(71) Applicant: Kubota Corporation, Osaka (JP)

(72) Inventor: Kazuma Harada, Amagasaki (JP)

(73) Assignee: Kubota Corporation, Osaka (JP)

( * ) Notice: Subject to any disclaimer, the term of this patent is extended or adjusted under 35 U.S.C. 154(b) by 247 days.

(21) Appl. No.: 18/291,715

(22) PCT Filed: Apr. 25, 2022

(86) PCT No.: PCT/JP2022/018669
§ 371 (c)(1),
(2) Date: Jan. 24, 2024

(87) PCT Pub. No.: WO2023/007889
PCT Pub. Date: Feb. 2, 2023

(65) Prior Publication Data

US 2024/0378729 A1 Nov. 14, 2024

(30) Foreign Application Priority Data

Jul. 30, 2021 (JP) ................................ 2021-125962

(51) Int. Cl.
*G06T 7/20* (2017.01)
*G06Q 50/06* (2024.01)
(Continued)

(52) U.S. Cl.
CPC ............... *G06T 7/20* (2013.01); *G06Q 50/06* (2013.01); *G06Q 50/08* (2013.01); *G06T 7/70* (2017.01);
(Continued)

(58) Field of Classification Search
CPC ........ G06V 10/82; G06V 10/40; G06V 20/10; G06V 2201/07; G06T 7/20; G06T 7/70; G06Q 50/08; G06Q 50/06
See application file for complete search history.

(56) References Cited

U.S. PATENT DOCUMENTS

2019/0022492 A1 1/2019 Takahashi et al.
2022/0237533 A1 * 7/2022 Imai .......................... G06T 7/70

FOREIGN PATENT DOCUMENTS

JP 2019-121294 A 7/2019
JP 2020-025320 A 2/2020
(Continued)

OTHER PUBLICATIONS

International Search Report and Written Opinion for PCT/JP2022/018669 and its English Translation mailed Jul. 12, 2022.
(Continued)

*Primary Examiner* — Tracy Mangialaschi
(74) *Attorney, Agent, or Firm* — Harness, Dickey & Pierce, P.L.C.

(57) ABSTRACT

A task in operation is accurately inferred. A task management device (3) includes: a data generating section (336) that generates time series data of coordinates; a linear data extracting section (337) that extracts linear data from the time series data of the coordinates; and a task inferring section (339) that infers, on the basis of the linear data and a target object included in a captured image, a task being carried out at a time point at which the captured image is obtained.

8 Claims, 10 Drawing Sheets

(51) Int. Cl.

| | |
|---|---|
| ***G06Q 50/08*** | (2012.01) |
| ***G06T 7/70*** | (2017.01) |
| ***G06V 10/40*** | (2022.01) |

(52) U.S. Cl.

CPC .......... *G06V 10/40* (2022.01); *G06V 2201/07* (2022.01)

(56) References Cited

FOREIGN PATENT DOCUMENTS

| | | | | | |
|---|---|---|---|---|---|
| JP | 2020107341 A | * | 7/2020 | ............. | G06Q 50/08 |
| JP | 2020-149546 A | | 9/2020 | | |
| JP | 2020-194243 A | | 12/2020 | | |
| WO | WO-2019073615 A1 | * | 4/2019 | ............. | G06Q 50/08 |
| WO | WO-2020241043 A1 | * | 12/2020 | ............. | G06T 7/254 |

OTHER PUBLICATIONS

Extended Search Report dated Jun. 10, 2025 issued in European patent application No. 22848971.2.

Japanese Office Action and English translation thereof for Japanese Application No. 2021-125962 mailed Oct. 29, 2024.

* cited by examiner

301

302

WORK MANAGEMENT DEVICE, WORK MANAGEMENT METHOD, AND WORK-IN-PROGRESS ESTIMATION MODEL

TECHNICAL FIELD

The present invention relates to a task management device etc.

BACKGROUND ART

A waterworks construction management system disclosed in Patent Literature 1 infers a present task state in waterworks construction, from a feature image that has been detected in a captured image that includes a task target region in the waterworks construction. Then, the waterworks construction management system determines, in accordance with the present task state thus inferred, the content of notification to a person involved in the waterworks construction.

CITATION LIST

Patent Literature

Patent Literature 1
Japanese Patent Application Publication Tokukai No. 2020-107341

SUMMARY OF INVENTION

Technical Problem

However, Patent Literature 1 does not specifically disclose inferring a task in operation in consideration of movement over time of a feature image in a captured image. An object of an aspect of the present invention is to provide a task management device etc. capable of precisely inferring a task in operation in consideration of movement of a target object that is included in a captured image.

Solution to Problem

In order to attain the object, a task management device in accordance with an aspect of the present invention includes: an image obtaining section configured to obtain, over time, captured images each including a task target region in waterworks construction; an image extracting section configured to extract, from each of the captured images that have been obtained over time, an image of at least one target object which is involved in the waterworks construction; a data generating section configured to, for each image of the at least one object that is inferred to be identical in each of the captured images, by extracting over time coordinates in a region containing the each image, generate time series data of the coordinates; a linear data extracting section configured to extract, from the time series data of the coordinates, linear data that is a part in which a value is continuously and regularly changed; and a task inferring section configured to infer, on the basis of the linear data and the image of the at least one target object, the image being included in each of the captured images, a task being carried out at a time point at which each of the captured images is obtained.

In order to attain the object, a task management method in accordance with an aspect of the present invention includes: an image obtaining step of obtaining, over time, captured images each including a task target region in waterworks construction; an image extracting step of extracting, from each of the captured images that have been obtained over time, an image of at least one target object which is involved in the waterworks construction; a data generating step of, for each image of the at least one object that is inferred to be identical in each of the captured images, by extracting over time coordinates in a region containing the each image, generating time series data of the coordinates; a linear data extracting step of extracting, from the time series data of the coordinates, linear data that is a part in which a value is continuously and regularly changed; and a task inferring step of inferring, on the basis of the linear data and the at least one target object from which the time series data of the coordinates from which time series data the linear data has been extracted is generated, a task being carried out at a time point at which each of the captured images is obtained.

In order to attain the object, an implemented-task inference model in accordance with an aspect of the present invention includes: an input layer into which (i) at least one of a plurality of indices for evaluating a task state in waterworks construction and (ii) linear data are inputted, the linear data being extracted as a result of obtaining, over time, captured images each including a task target region in waterworks construction, and being a part in which a value is continuously and regularly changed in time series data of coordinates included in an image of a target object that is included in the captured images and that is one of the plurality of indices; an output layer which outputs at least one task in the waterworks construction; and an intermediate layer in which parameters have been learned on the basis of the plurality of indices, a plurality of pieces of the linear data, and a plurality of tasks that the at least one task comprises, in a case where the at least one of the plurality of indices and the linear data are inputted into the input layer, the implemented-task inference model causing a computer to function to output, from the output layer via an operation performed by the intermediate layer, a task being carried out at a time point at which each of the captured images is obtained.

Advantageous Effects of Invention

An aspect of the present invention makes it possible to precisely infer a task in operation in consideration of movement of a target object that is included in a captured image.

DESCRIPTION OF EMBODIMENTS

[Configuration of Waterworks Construction Management System]

Figure 1:
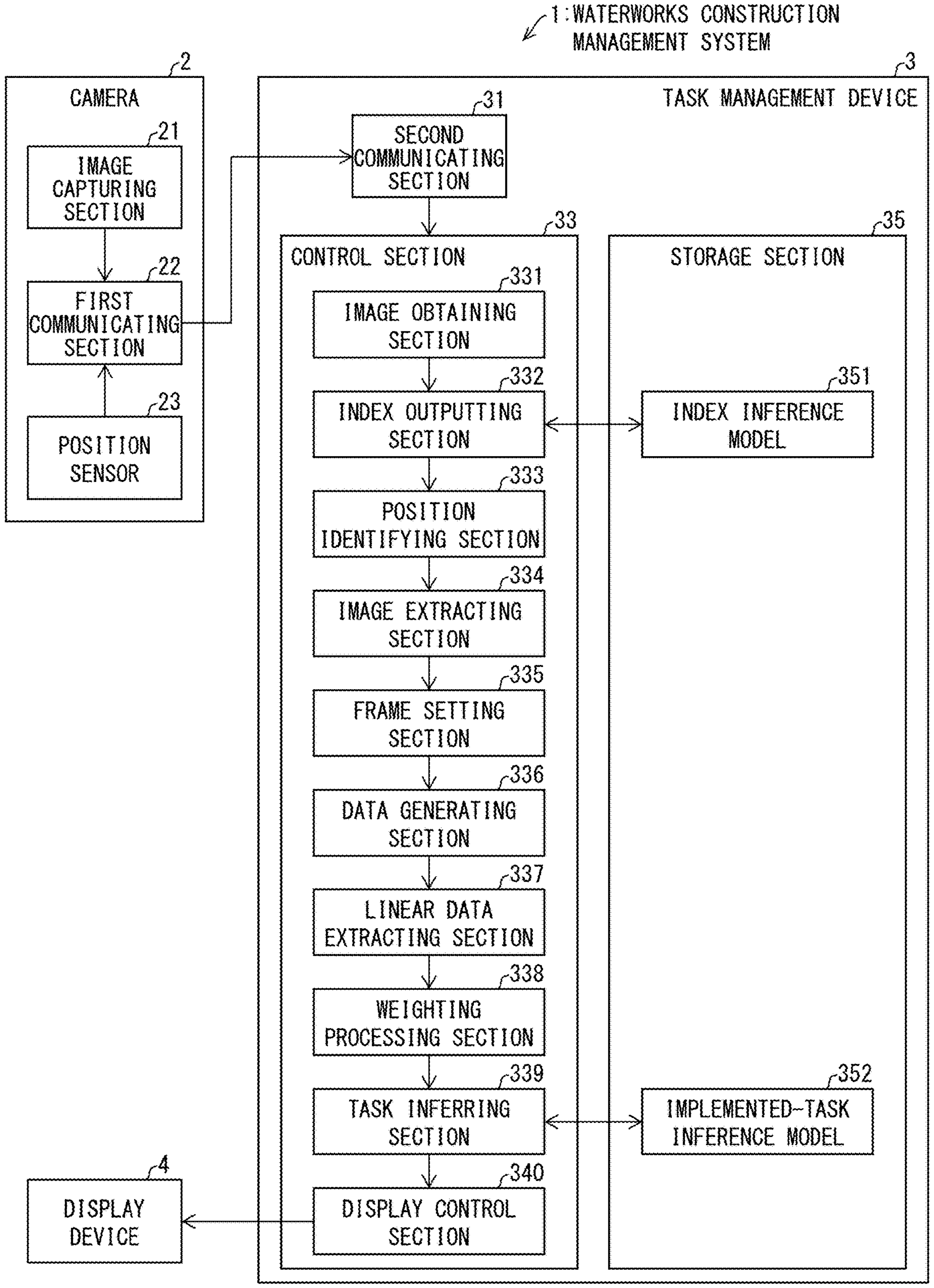
FIG. 1 is a block diagram illustrating an example of a schematic configuration of a waterworks construction management system.

FIG. 1 is a block diagram illustrating an example of a schematic configuration of a waterworks construction management system 1 in accordance with an embodiment of the present invention. The waterworks construction management system 1 manages various tasks in waterworks construction (e.g., progress of waterworks construction) in which a pipe is to be installed. The waterworks construction management system 1 includes a camera 2, a task management device 3, and a display device 4.

The camera 2 captures an image of each of various tasks that are carried out at one or more waterworks construction sites. The camera 2 only needs to be capable of capturing an image of a task target region where the various tasks are to be carried out. Examples of the camera 2 include a camera that is attached to a helmet or work clothing (e.g., an arm part of the work clothing) of a worker (person involved in the waterworks construction) for capturing an image of an operation at hand, and a camera that is mounted on any of various working tools (e.g., a backhoe). Further, examples of the camera 2 include a camera that is installed in or near the task target region.

Figure 2:
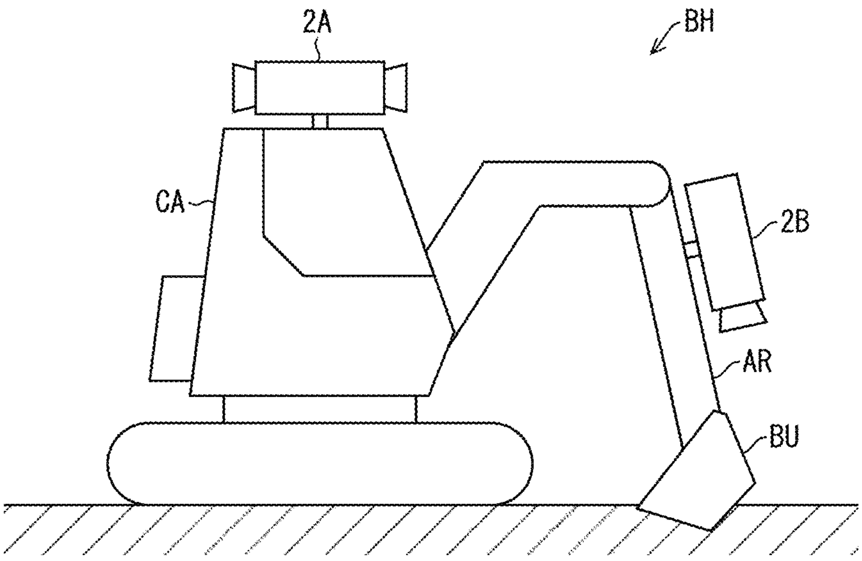
FIG. 2 is a diagram illustrating an example of a backhoe on which a camera is mounted.

FIG. 2 is a diagram illustrating an example of a backhoe BH on which the camera 2 is mounted. On the backhoe BH, a first camera 2A and a second camera 2B are mounted as the camera 2. The first camera 2A is attached to an upper surface part of a cabin CA of the backhoe BH. An image capture direction of the first camera 2A may be forward and backward of a driver seat of the cabin CA. The second camera 2B is attached to an arm AR so that the image capture direction faces toward a bucket BU. This enables the camera 2 to capture images of surroundings of the backhoe BH, the bucket BU, and surroundings of the bucket BU. Note, however, that only one of the first camera 2A and the second camera 2B may be configured to be mounted on the backhoe BH. Furthermore, the image capture direction of the first camera 2A may be only one of forward and backward of the driver seat. Moreover, the first camera 2A may be capable of capturing an image of an environment around the backhoe BH by rotating around a vertical direction.

An image capturing section 21 captures an image of at least the task target region in the waterworks construction. The image capturing section 21 may capture a static image or a moving image. In a single case of waterworks construction, image capturing may be carried out a plurality of times. The task target region (consequently, the camera 2) may be fixed or may be movable with every image capture regarded as a unit. Every time image capturing is carried out, the image capturing section 21 creates a captured image that includes the task target region.

A position sensor 23 is a sensor that measures a position (absolute coordinates) and an orientation of the camera 2 on the ground. The position sensor 23 measures the position of the camera 2 by, for example, receiving a global positioning system (GPS) signal. Further, the position sensor 23 includes, for example, a geomagnetic sensor as a sensor for measuring the orientation. The orientation measured by the position sensor 23 enables the task management device 3 to identify the image capture direction of the camera 2.

A first communicating section 22 is connected with the task management device 3 so as to be capable of communicating with the task management device 3, and forwards, to the task management device 3, data of the captured image that has been obtained by the image capturing section 21 and data indicative of the position and the orientation of the camera 2 that have been measured by the position sensor 23. The first communicating section 22 and a second communicating section 31 of the task management device 3 carry out wireless communication, but may perform wired communication.

Note that the camera 2 which is stationary does not necessarily need to include the position sensor 23. That is, in this case, the camera 2 does not transmit data indicative of the position and the orientation of the camera 2 that have been measured by the position sensor 23.

The task management device 3 manages various tasks that are being carried out as the waterworks construction. The task management device 3 manages a task for each of a plurality of waterworks construction sites in a case where tasks are to be managed at the plurality of waterworks construction sites. The task management device 3 will be discussed later in details.

The display device 4 displays, to a manager who manages the waterworks construction (person involved in the waterworks construction), various pieces of information relevant to the waterworks construction. The display device 4 displays, for example, various pieces of information that are outputted from the task management device 3. The display device 4 displays, for example, a result of inference of a task by the task management device 3.

The display device 4 is a monitor or a personal computer with which the manager manages the various tasks. Note that the display device 4 may be an electronic device (e.g., tablet or smartphone) that the worker owns. In this case, the display device 4 can display, to the worker, various pieces of information relevant to the waterworks construction. Further, the waterworks construction management system 1 may include a sound outputting device (e.g., loudspeaker) that outputs each of the above various pieces of information as a sound. In other words, the waterworks construction management system 1 only needs to include a notification section (e.g., the display device 4 and the sound outputting device) that can be connected with the task management device 3 so as to be capable of communicating with the task management device 3 and that provides notification of various data which is transmitted from the task management device 3.

[Configuration of Task Management Device]

The task management device 3 includes the second communicating section 31, a control section 33, and a storage section 35. The second communicating section 31 receives, from the camera 2, the data of the captured image and the data indicative of the position and the orientation of the camera 2. The control section 33 comprehensively controls sections of the task management device 3. The storage section 35 stores various programs that are used by the control section 33 and various data that are used by the control section 33. The storage section 35 stores, for example, an index inference model 351 (described later) and an implemented-task inference model 352 (described later). The storage section 35 may be realized by a storage device that is different from the task management device 3 and that is connected with the task management device 3 so as to be capable of communicating with the task management device 3.

The control section 33 includes an image obtaining section 331, an index outputting section 332, a position identifying section 333, an image extracting section 334, a frame setting section 335, a data generating section 336, a linear data extracting section 337, a weighting processing section 338, a task inferring section 339, and a display control section 340.

The image obtaining section 331 obtains, over time, captured images which are transferred from the camera 2 and each of which includes a task target region in waterworks construction.

The index outputting section 332 inputs, to the index inference model 351 that is stored in the storage section 35, the captured images that have been obtained by the image obtaining section 331. The index inference model 351 is a trained model that is constructed, by machine learning, to infer at least one index that is among a plurality of indices for evaluating a task state in the waterworks construction and that appears in a task at a specified time point. In the present embodiment, the index is referred to as a detection class that needs to be detected from a captured image in order to evaluate the task state.

Examples of the detection class include single objects such as any of various pipes (conduits) used in waterworks construction, a worker, a general person other than the worker, any of various working tools used in the waterworks construction, and a groove in which a pipe is installed. The detection class may be a combination of a plurality of the single objects. It is possible to set, as one detection class, for example, a combination of a groove and a worker who is in the groove.

Examples of the various pipes include straight pipes and deformed pipes. Examples of various working tools (e.g., work machines (work vehicles) and tools) include an asphalt cutter, a backhoe, a dump truck, a rammer, a cone (or a pole), a sheet pile, a stopper, a sleeper, and a ladder. Further, a working tool that is set as the detection class may be a part of the working tool. For example, it is possible to set, as the detection class, a sling belt and a bucket that is a part of the backhoe.

It is possible to set, as the detection class, an object that allows the task state to be determined. For example, it is possible to set, as the detection class, for example, an object which characterizes that an appropriate task (standard task) is being carried out and an object which characterizes a dangerous task. Examples of such an object which characterizes that a standard task is being carried out include a work posture of a worker who is carrying out the standard task. Examples of the object which characterizes a dangerous task include a groove for which no safety cone is placed.

The index inference model 351 is a trained model that is constructed so as to extract and output, as a result of input of the captured image, a detection class as described above which is included in the captured image. The index inference model 351 may be, for example, a neural network (e.g., convolutional neural network (CNN)) that includes at least an input layer, an intermediate layer, and an output layer.

In the index inference model 351, the input layer is a layer into which the captured image is inputted. The intermediate layer is a layer in which parameters have been learned on the basis of a region image that includes the task target region, an article image that indicates an object to be used in the waterworks construction, and the detection class. The output layer is a layer that outputs at least one detection class.

For example, data in which the detection class as correct answer data is associated with each of a plurality of region images and each of a plurality of article images is prepared as training data. The index inference model 351 is constructed by sequentially inputting training data and learning parameters (weights and biases) so as to minimize a loss function. The index inference model 351 is constructed by, for example, a model generating device (not illustrated). However, the index inference model 351 is not limited to a model thus constructed, and may be constructed by, for example, the control section 33. In this case, the control section 33 also has a function as a learning device that constructs the index inference model 351 by machine learning in which the training data is used.

Note that other trained models (described later) may be constructed by sequentially inputting training data and learning parameters so as to minimize the loss function, and may be constructed by the model generating device or the control section 33.

The region image may be a difference image or a composite image other than the captured image that has been captured by the camera 2. The difference image is, for example, an image obtained by extracting a difference between two captured images that have been captured over time. The composite image is, for example, an image in which any of various background images (virtual background images) that are prepared in advance is embedded in a background region of the task target region whose image has been captured. The article image may be an image that has been obtained by capturing an image of one or more of the above-described various pipes and various working tools. It is possible to prepare, as the article image for one pipe and one working tool, a plurality of images that are obtained by changing respective sizes of the pipe and the working tool. In this way, preparing such a processed image in addition to the captured image makes it possible to prepare diverse training data from a smaller number of captured images. Further, the region image and the article image may include an image that is suitable for inference of the detection class.

In a case where a captured image is inputted into the input layer, the index inference model 351 thus constructed causes a computer to function to output, from the output layer via an operation performed by the intermediate layer, at least one detection class that is inferred to appear in a task at a time point at which the captured image is obtained. That is, by inputting the captured image to the index inference model 351, the index outputting section 332 outputs at least one detection class that is inferred to appear in the task at the time point at which the captured image is obtained. Note that the time point at which the captured image is obtained refers to a time point at which the captured image is obtained by the image obtaining section 331, but may be alternatively read as a time point at which an image of the task target region is captured by the camera 2.

Figure 3:
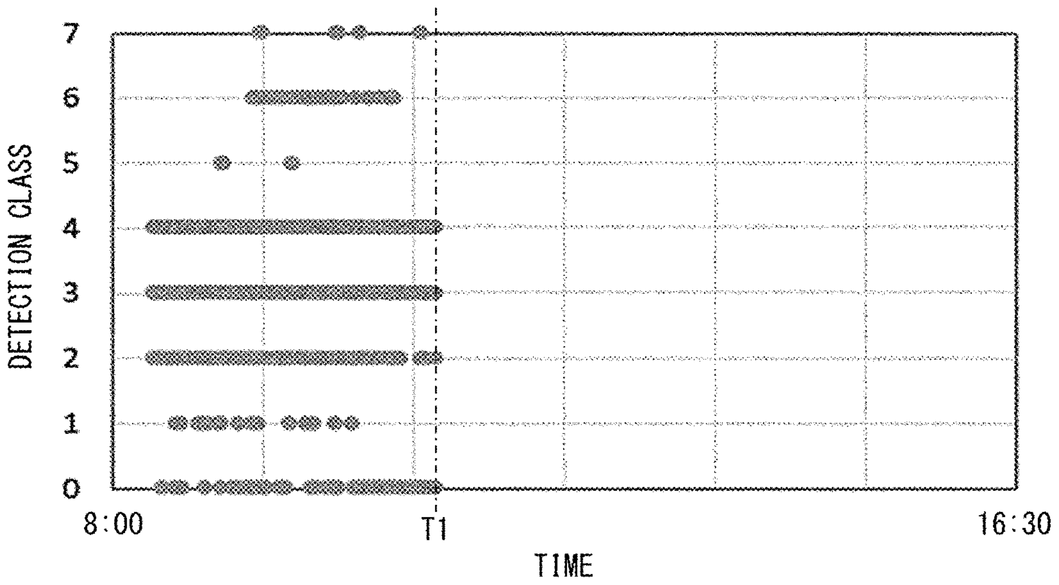
FIG. 3 is a diagram illustrating an example of an output result from an index outputting section.
Figure 3:
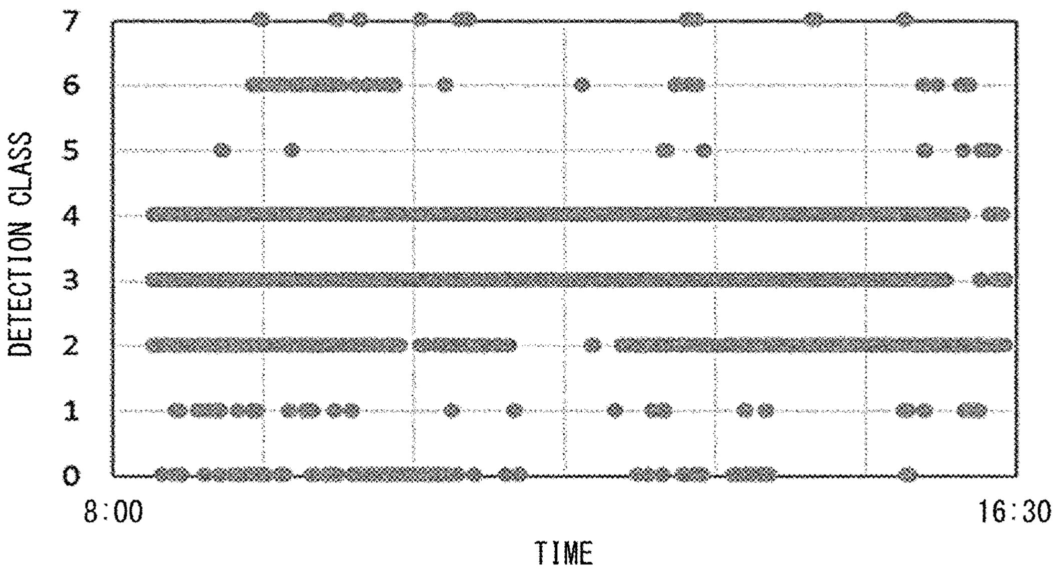

FIG. 3 is a diagram illustrating an example of an output result from the index outputting section 332. In FIG. 3, a diagram indicated by a reference sign 301 shows an output result from a start of a task to time T1 on one specific day, and a diagram indicated by a reference sign 302 shows an output result from the start of the task to an end of the task on the one specific day. In the diagrams indicated by the reference signs 301 and 302, a vertical axis shows the number assigned to each detection class, and a horizontal axis shows task time. For example, the number is assigned to each of the above-described detection classes. For example, "0" is assigned to the worker, "1" is assigned to the straight pipe, "2" is assigned to the deformed pipe, "3" is assigned to the backhoe (e.g., a body part including the cabin and/or a crawler), and "4" is assigned to the bucket. In the example of FIG. 3, "0" to "7" are shown as the numbers corresponding to the detection classes. The number of the assigned numbers corresponds to the number of predetermined detection classes.

Assume, for example, a case where the captured image obtained at the time T1 includes a worker, a deformed pipe, a backhoe, and a bucket. In this case, the index outputting section 332 outputs, at the time T1, a combination of "0" and "2" to "4" that correspond to those detection classes, as shown in the diagram indicated by the reference sign 301 in FIG. 3. The index outputting section 332 inputs, to the index inference model 351, captured images over time from the start of the task. Thus, as shown in the diagram indicated by the reference sign 301, at the time T1, the index outputting section 332 can output a combination of the detection classes at each time point from the start of the task (8:00) to the time T1. As a result, as shown in the diagram indicated by the reference sign 302, at a time point at which the task on the one day ends, the index outputting section 332 can output a combination of the detection classes at each time point from the start of the task to the end of the task on the one day.

Note that the index inference model 351 outputs a numerical value (e.g., a numerical value of 0 or more and 1 or less) of each detection class as a result of the above operation. A detection class that has a greater numerical value results in a higher degree of certainty that the captured image contains an object indicated by the detection class. Thus, the index inference model 351 infers, as the detection class that is included in the captured image, a detection class whose numerical value is not less than a predetermined threshold value. The index inference model 351 may output, as an output result together with the detection class, for example, the above-described numerical value as a degree of accuracy (reliability) of inference of the detection class. Note that the predetermined threshold value only needs to be set to a degree that allows the task to be appropriately inferred from the combination of the detection classes. The predetermined threshold value is set to, for example, 0.2.

The position identifying section 333 identifies, in the captured image, a position of a detection class that has been outputted by the index outputting section 332. The position identifying section 333 can identify the position of the detection class in the captured image by, for example, inputting the captured image to a position inference model that is constructed so as to infer the position of the detection class in the captured image with use of training data in which the article image and the detection class are associated with each other. The position inference model may be stored in the storage section 35 and may be, for example, a trained model that is realized by regions with CNN (R-CNN).

The image extracting section 334 extracts, from each of captured images that have been obtained over time by the image obtaining section 331, an image of a target object which is involved in waterworks construction. The image extracting section 334 extracts, from the captured images, images of all target objects included in the captured images.

A target object is an object in which movement may occur in the waterworks construction. Examples of the target object include various pipes used in waterworks construction, various working tools used in the waterworks construction, a worker, and a general person other than the worker. That is, the target object is included in the detection class. Thus, in the present embodiment, in a case where at least one detection class that has been outputted by the index outputting section 332 includes a detection class in which movement may occur in waterworks construction, i.e., in a case where the captured images include an image of a target object corresponding to the detection class, the image extracting section 334 extracts the image of the target object from the captured images. For example, in a case where a bucket appears in the captured images, the index outputting section 332 outputs, as the detection class, a number that corresponds to the bucket. Further, the position identifying section 333 identifies a position of the bucket in the captured images. Thus, the image extracting section 334 can extract an image of the bucket from the captured images.

The frame setting section 335 sets, around the image of the target object, the image having been extracted by the image extracting section 334, a frame that is in accordance with a size of the image of the target object. The frame setting section 335 may alternatively set a frame around a part of the image of the target object. For example, in a case where the image of the bucket is extracted as the target object, the frame setting section 335 may set the frame around the entire bucket or may set the frame around a part of the bucket (e.g., an opening of the bucket).

A method in which the frame is set by the frame setting section 335 may be a publicly-known technique. Further, the frame setting section 335 may set, for the image of the target object, a frame having a size that is in accordance with a degree of accuracy of inference of the detection class. For example, a higher degree of accuracy allows the frame setting section 335 to set the size of the frame to a smaller size. That is, a higher degree of accuracy allows the frame setting section 335 to set the size of the frame so that the frame fits the target object. A method in which the frame that is in accordance with the degree of accuracy is set may also be a publicly-known technique.

Figure 4:
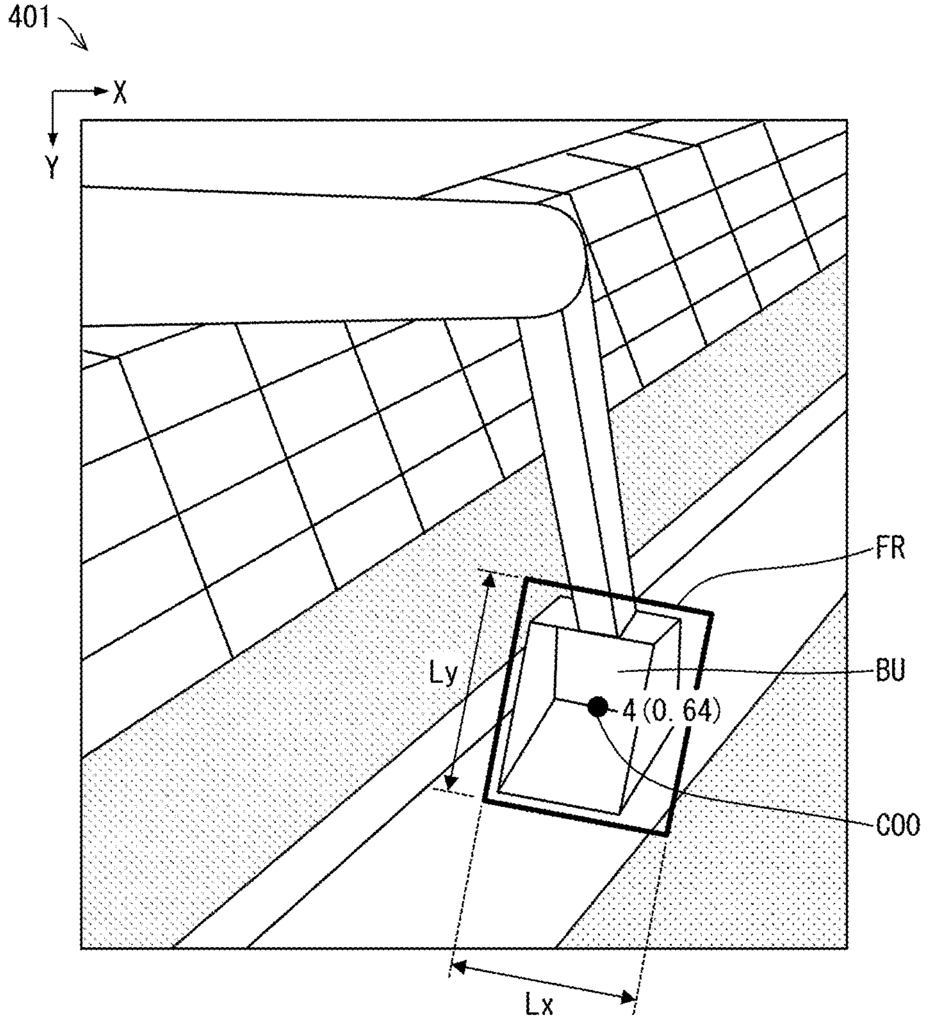
FIG. 4 is a diagram for describing a frame that is set in a captured image.
Figure 4:
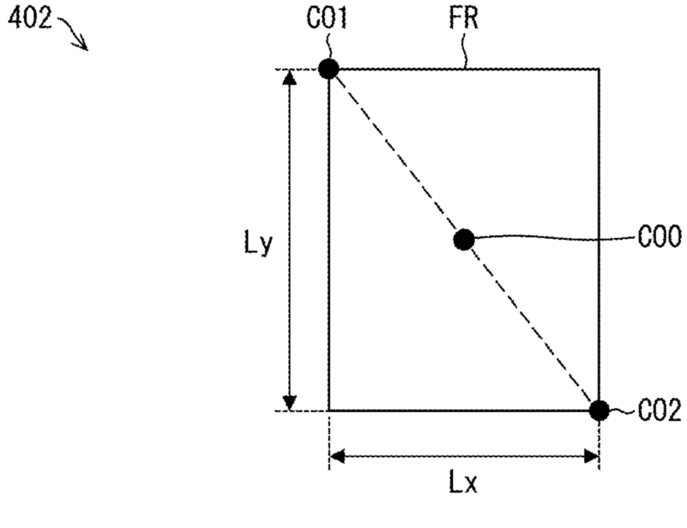

A diagram indicated by a reference sign 401 in FIG. 4 illustrates a part of a captured image in which a frame FR has been set. This captured image is an example of an image obtained by capturing a task of excavating a groove by machinery (e.g., a task of forming a groove on a road with use of a backhoe). In the diagram indicated by the reference sign 401, to the bucket BU serving as the target object, the detection class "4" and a degree of accuracy "0.64" with which the detection class has been inferred to be the bucket BU are displayed as an output result from the index outputting section 332. Further, the rectangular frame FR that is rectangular and that is set by the frame setting section 335 so as to surround the bucket BU is displayed. Note that the frame FR may have a shape which is not limited to a rectangular shape but is another shape (e.g., an elliptical shape).

By extracting over time, for each image of at least one target object that is inferred to be identical in each of the captured images obtained by the image obtaining section 331, coordinates in a region containing the each image, the data generating section 336 generates time series data of the coordinates.

In the present embodiment, the index outputting section 332 infers the detection class in each of the captured images. The data generating section 336 extracts the coordinates for each detection class that is among at least one detection class which is inferred to be identical in each of the captured images and that corresponds to the target object. The data generating section 336 generates, for the each detection class, time series data of the coordinates. For example, in a case where an image of the backhoe (body part) and an image of the bucket are extracted from each of the captured images, the data generating section 336 individually extracts coordinates in a region containing the image of the backhoe and coordinates in a region containing the image of the bucket. The data generating section 336 individually generates time series data of the coordinates corresponding to the backhoe and time series data of the coordinates corresponding to the bucket.

The data generating section 336 extracts, as the coordinates, coordinates of a position predetermined in the frame set by the frame setting section 335. In the present embodiment, the data generating section 336 extracts, as the coordinates of the predetermined position, center coordinates of the frame set by the frame setting section 335.

A diagram indicated by a reference sign 402 in FIG. 4 is for describing calculation of center coordinates CO0. As in the diagram indicated by the reference sign 402, the frame setting section 335 that sets the frame FR identifies coordinates CO1 and coordinates CO2 of two opposite corners among four corners of the frame FR. The data generating section 336 calculates the center coordinates CO0 from the coordinates CO1 and the coordinates CO2 of the two corners. Note that the data generating section 336 may extract, as the coordinates of the predetermined position, not only the center coordinates CO0 but also any coordinates (e.g., the coordinates CO1 or the coordinates CO2) in the frame FR.

Figure 5:
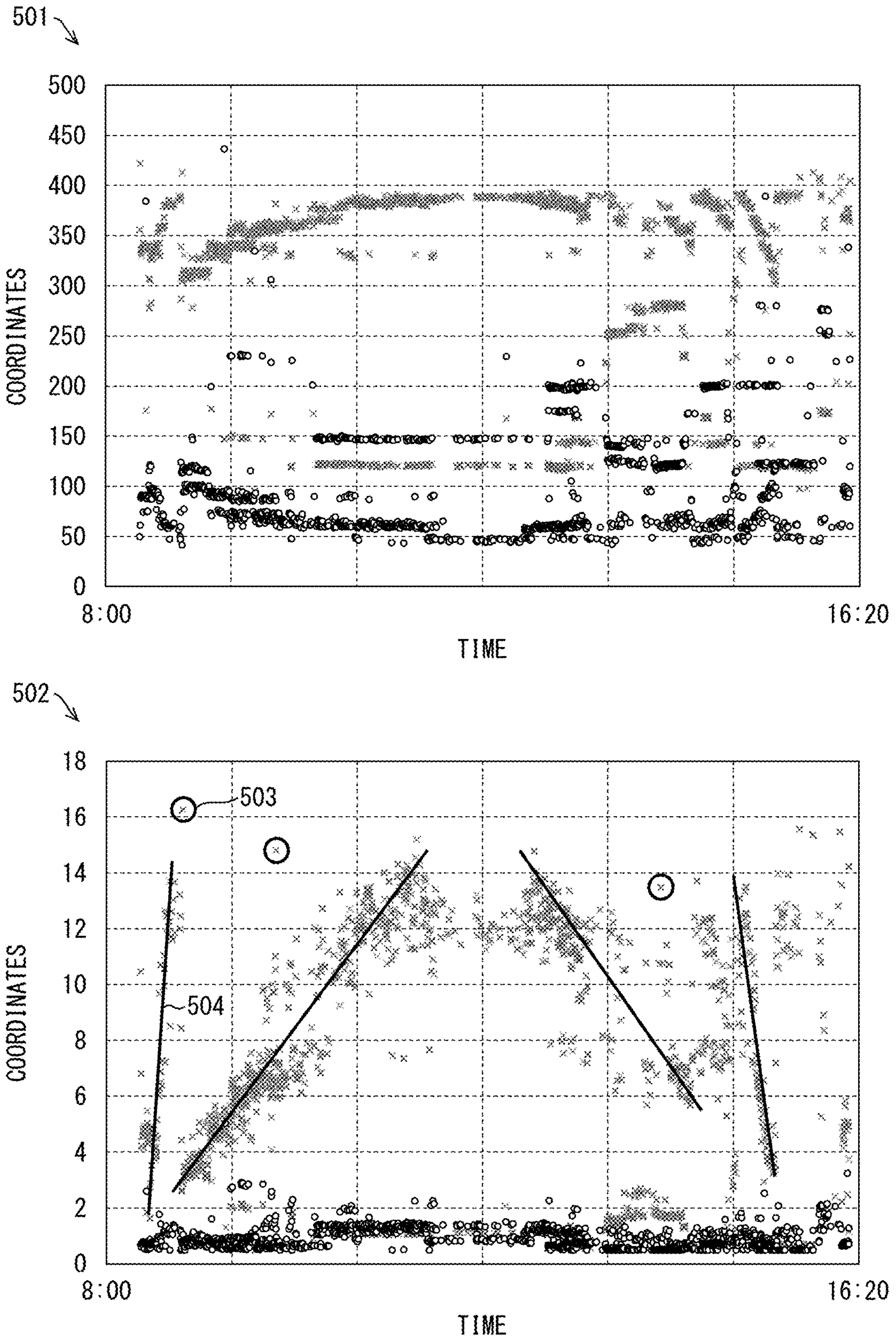
FIG. 5 is a diagram illustrating an example of time series data of coordinates that has been generated by a data generating section.

A diagram indicated by a reference sign 501 in FIG. 5 illustrates an example of time series data of coordinates that are extracted from an image of one specific target object, the time series data being generated by the data generating section 336. In the diagram indicated by the reference sign 501, the vertical axis shows a value of the coordinates in a captured image, and the horizontal axis shows task time. The time series data of the coordinates in the diagram indicated by the reference sign 501 is time series data of coordinates that have been extracted during a period from a start of a task to an end of the task on one specific day. The diagram indicated by the reference sign 501 shows time series data of coordinates that have been extracted during a period of 30,000 seconds (e.g., between 8:00 and 16:20) from the start of the task. Further, the diagram indicated by the reference sign 501 shows a graph obtained by plotting the center coordinates CO0 of the frame FR for the image of the bucket that is included in the captured image. In the diagram indicated by the reference sign 501, an X-coordinate of the center coordinates CO0 is indicated by a "x" mark, and a Y-coordinate of the center coordinates CO0 is indicated by a "○" mark. In a case where a task is carried out from the start of the task to the time T1, time series data of coordinates that are extracted from an image of a target object from the start of the task to the time T1 is generated for each target object as in the case of the output result from the index outputting section 332 in the diagram indicated by the reference sign 301 in FIG. 3.

The data generating section 336 normalizes the extracted coordinates with use of a size of the image of the target object from which image the coordinates have been extracted. In the present embodiment, the data generating section 336 normalizes the extracted coordinates with use of a size of the frame from which the coordinates have been extracted. Specifically, the data generating section 336 divides the X-coordinate of the extracted center coordinates CO0 by a length Lx of a side of the frame FR illustrated in FIG. 4. The data generating section 336 also divides the Y-coordinate of the center coordinates CO0 by a length Ly of a side of the frame FR illustrated in FIG. 4. Lx indicates, in the frame FR, a length of a side that extends in an X-axis direction of a captured image or a length of a side that extends in a direction closer to the X-axis direction than to a Y-axis direction. Ly indicates, in the frame FR, a length of a side that extends in the Y-axis direction of the captured image or a length of a side that extends in a direction closer to the Y-axis direction than to the X-axis direction. The diagram indicated by the reference sign 502 in FIG. 5 illustrates an example of a result of the data generating section 336 normalizing the time series data of the coordinates in the diagram indicated by the reference sign 501. In the diagram indicated by the reference sign 502, the vertical axis shows a value of the coordinates in the captured image, and the horizontal axis shows task time.

The data generating section 336 removes an outlier from the time series data of the extracted coordinates. For example, for each coordinates, the data generating section 336 sets a circle whose center is the each coordinates and whose radius is a predetermined distance. In a case where there are no other coordinates different from the coordinates of the center in a range of the circle, the data generating section 336 may detect the coordinates of the center of the circle as an outlier. In addition, the data generating section 336 may use a publicly-known outlier detection method such as a statistics-based outlier detection method to detect the outlier in the time series data of the coordinates. The data generating section 336 carries out an outlier detection process in each of the X-coordinate and the Y-coordinate.

The diagram indicated by the reference sign 502 in FIG. 5 shows a result obtained by carrying out the outlier detection process in the X-coordinate. In the diagram indicated by the reference sign 502, the outlier is indicated by a reference sign 503. The data generating section 336 removes, from the time series data of the coordinates, the outlier thus detected. Outliers illustrated in the diagram indicated by the reference sign 502 are merely an example and indicate some of outliers detected in the outlier detection process.

Note that a process for normalizing the coordinates and a process for removing the outlier do not necessarily need to be carried out by the data generating section 336. However, in a case where the data generating section 336 carries out the process for normalizing the coordinates, the coordinates can be extracted with the possibility of being affected by a distance from the captured image reduced. In this case, it is possible to more accurately reflect movement of the target object in linear data that is extracted by the linear data extracting section 337. For example, it is possible to decrease a slope (described later) as the target object less moves, and increase the slope (described later) as the target object more greatly moves. Further, in a case where the data generating section 336 carries out the process for removing the outlier, the linear data extracting section 337 can extract the linear data in a state in which coordinates that have been erroneously detected or coordinates that have a low degree of reliability have been removed from the time series data of the coordinates.

The linear data extracting section 337 extracts, from the time series data of the coordinates that has been generated by the data generating section 336, linear data that is a part in which a value is continuously and regularly changed. In the present embodiment, after the data generating section 336 normalizes the X-coordinate and the Y-coordinate, the linear data extracting section 337 extracts the linear data from the time series data of the coordinates from which time series data the outlier has been removed. The data generating section 336 generates the time series data of the coordinates from the start of the task to a time point at which the captured image was most recently obtained. For example, in a case where the captured image was most recently obtained at the time T1, the data generating section 336 generates time series data of coordinates extracted from all captured images that have been obtained during a period from the start of the task to the time T1. Thus, in this case, the linear data extracting section 337 extracts the linear data in the time series data of the coordinates that have been extracted from all the captured images that have been obtained during the time period from the start of the task to the time T1. The linear data extracting section 337 may extract the linear data with use of a publicly-known linear extraction method such as a least squares method used in a simple regression analysis.

Note here that in the time series data of the coordinates, a part in which coordinates that are temporally adjacent to each other are changed is referred to as a continuous change in value. Note, however, that a case where adjacent coordinates are not changed but a plurality of coordinates extracted in a certain period of time (corresponding to several captured images) include coordinates having different values may be referred to as a continuous change in value in the coordinates extracted in the certain period of time. The linear data extracting section 337 which has determined that there is a difference of not less than a specified value between two adjacent coordinates may identify a change in value in the two coordinates as a change in non-continuous value. The specified value only needs to be set so that significant linear data can be extracted as the linear data. The significant linear data refers to data in which actual movement of the target object is reflected. Usefulness of the linear data only needs to be demonstrated by, for example, an experiment. Further, a part in which a value is continuously changed and which is correlated with a straight line or a curve is referred to as a regular change in value. That is, the linear data may be a straight line or Nth order curve (N≥2).

Specifically, it can be said that the linear data is (i) a straight line which has a slope other than 0 or (ii) a curve having a tangent which has a slope other than 0. In a case where such a straight line or curve is present in the time series data of the coordinates, it can be evaluated that there is movement in the target object. That is, it can be evaluated that there is movement in the target object in a time period in which the linear data has been successfully extracted from the time series data of the coordinates and that there is no movement in a time period other than the above time period. By also incorporating this linear data into one of elements of task inference, the task inferring section 339 (described later) can infer, also in consideration of movement of the target object, a task that is presently being carried out.

The diagram indicated by the reference sign 502 in FIG. 5 illustrates an example of a result in which linear data has been extracted from time series data of the X-coordinate. The linear data illustrated in the diagram indicated by the reference sign 502 is merely an example and indicates some of linear data extracted in a linear data extraction process. In the diagram indicated by the reference sign 502, the linear data is indicated by a reference sign 504. In the present embodiment, the linear data extracting section 337 extracts straight-line data as the linear data, but may extract the Nth order curve (N≥2) as described earlier. Note that a straight line or curve to be fitted may be selected for each task in consideration of a correlation between the content of a task and movement of a target object involved in the task. A straight line or curve that is selected for each task may be predetermined via, for example, an experiment.

As described earlier, it can be evaluated that there is movement in the target object in a time period in which the linear data has been extracted from the time series data of the coordinates. In the example of the reference sign 502, the control section 33 can determine that the bucket is moving in the time period in which the linear data has been extracted.

In the at least one detection class that has been outputted by the index outputting section 332, the weighting processing section 338 assigns more weights to a time period in which the linear data extracting section 337 has extracted the linear data than to a time period other than the above time period. Such weighting means that movement occurs in a target object from which the time series data of the coordinates from which time series data the linear data has been extracted is generated. For example, in a case where the index outputting section 332 adds a point to a detection class when outputting the detection class, the weighting processing section 338 may further add a point to the detection class in a time period in which the linear data has been extracted. That is, the control section 33 may give a score (e.g., 1 point) when the detection class is outputted, and may further give a score (e.g., 1 point) in the time period in which the linear data has been extracted. Further, the weighting processing section 338 may add a score to the degree of accuracy of the detection class for the time period in which the linear data has been extracted.

Figure 6:
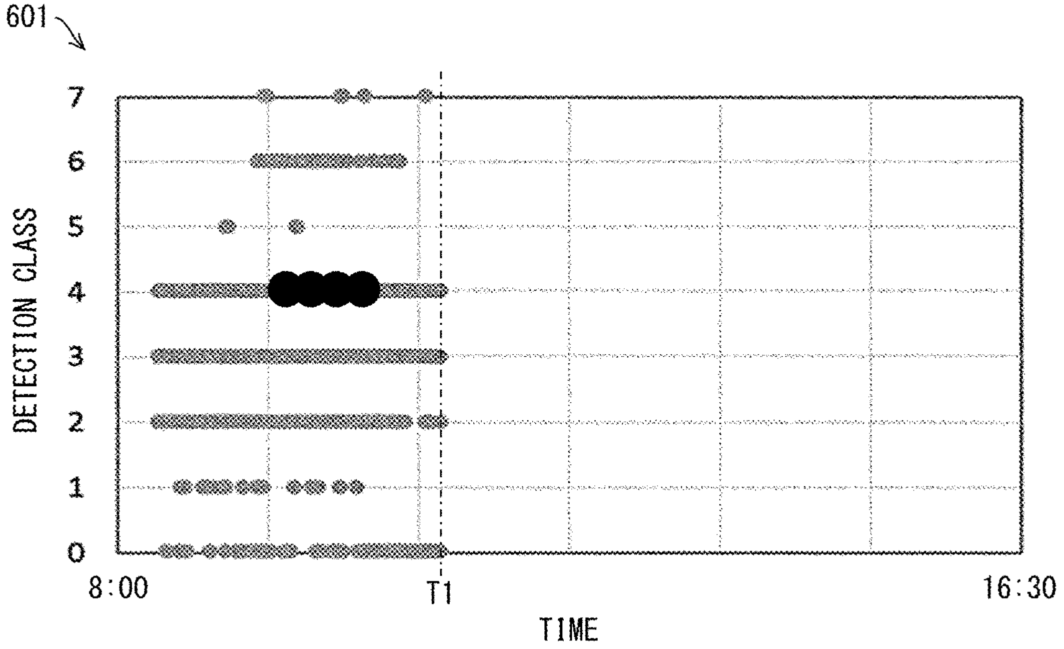
FIG. 6 is a diagram illustrating an example of an output result from a weighting processing section.
Figure 6:
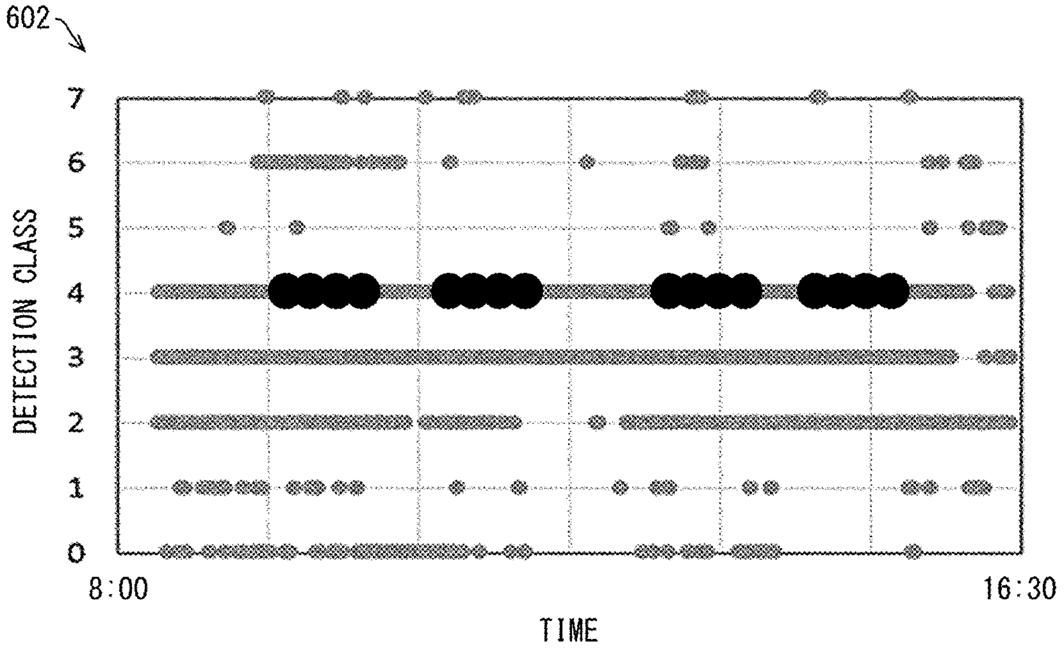

FIG. 6 is a diagram illustrating an example of an output result from the weighting processing section 338. Specifically, FIG. 6 is a diagram in which a result of weighting by the weighting processing section 338 is reflected in the output result from the index outputting section 332 in FIG. 3. In a diagram indicated by a reference sign 601 in FIG. 6, the result of weighting is reflected in the output result illustrated in the diagram indicated by the reference sign 301 in FIG. 3. In a diagram indicated by a reference sign 602, the result of weighting is reflected in the output result illustrated in the diagram indicated by the reference sign 302 in FIG. 3. In the diagrams indicated by the reference signs 601 and 602, a "•" mark is assigned to the at least one detection class that has been outputted by the index outputting section 332. In a time period in which the weighting processing section 338 has carried out weighting, a "•" mark is assigned that is larger than a "•" mark which is assigned in a time period other than the above time period. The above score may be reflected in a size of the "•" mark. The weighting processing section 338 only needs to carry out, as the result of weighting, output indicating that in the time period in which the linear data has been extracted, the at least one detection class which has been outputted by the index outputting section 332 is in a state different from a state in a time period other than the above time period.

The task inferring section 339 infers, on the basis of the linear data that has been extracted by the linear data extracting section 337 and a target object that is included in a captured image, a task that is being carried out at a time point at which the captured image is obtained. In the present embodiment, the task inferring section 339 infers, on the basis of the linear data extracted by the linear data extracting section 337 and the output result from the index outputting section 332, the task that is being carried out at the time point at which the captured image is obtained.

The task inferring section 339 infers, on the basis of the output result from the index outputting section 332, the task that is being carried out at the time point at which the captured image is obtained. Specifically, by analyzing combinations of detection classes that the index outputting section 332 has outputted over time, the combinations appearing at respective time points at each of which the captured image was obtained, the task inferring section 339 infers the task that was being carried out at the time point at which the image obtaining section 331 most recently obtained the captured image. That is, from (i) a combination of detection classes that are inferred on the basis of the captured image which the image obtaining section 331 most recently obtained and (ii) a combination of detection classes that are inferred on the basis of the captured image (past captured image) at at least one time point immediately before the time point at which the image obtaining section 331 most recently obtained the captured image, the task inferring section 339 infers the task that is presently being carried out.

Furthermore, in a case where linear data is extracted in time series data of coordinates of a target object that corresponds to an inferred detection class, the task inferring section 339 determines that the target object is present in a time period in which the linear data is extracted and that movement occurs in the target object. That is, the task inferring section 339 determines, in the weighted time period, that movement occurs in the target object. The task inferring section 339 infers, in consideration of presence or absence of movement in the target object in addition to the output result from the index outputting section 332 at each time point, a task that is presently being carried out.

The storage section 35 may store data in which the respective contents of tasks that can be carried out in the waterworks construction, the combinations of the detection classes, and presence or absence of movement in the target object corresponding to the at least one detection class are associated with each other. In this case, by referring to the storage section 35, the task inferring section 339 can infer, from the output result from the index outputting section 332 and a result of extraction of the linear data by the linear data extracting section 337 (output result from the weighting processing section 338), the task that is presently being carried out.

For example, as a detection class, for example, a combination of a groove, a backhoe (body), a bucket, and a dump truck are associated with a task of excavating a groove by machinery. Further, continuous movement of the bucket is associated with the above task. On the basis of the output result from the index outputting section 332, the task inferring section 339 makes a determination as to the following two items in captured images that are continuously obtained. On the basis of a result of the determination, the task inferring section 339 determines whether the above task is being carried out.

Presence or absence of detection classes indicative of a groove, a backhoe (body), a bucket, and a dump truck.

Presence or absence of linear data indicative of movement of the bucket.

Further, it is possible to associate, with a task, specific movement of a target object that is unique to the task. For example, a slope at each time point of linear data extracted from each of time series data of the X-coordinate and time series data of the Y-coordinate and specific movement of the target object that is unique to the task may be associated with each other. For example, it is possible to associate, with the task of excavating a groove by machinery, movement of the bucket, such as linear movement along a groove to be excavated and movement between the groove and the dump truck. In this case, in consideration of movement of the bucket while the groove is being formed or movement while earth and sand that have appeared during excavation of the groove are being loaded on the dump truck, the task inferring section 339 can determine whether the task is being carried out.

In the present embodiment, by inputting, to the implemented-task inference model 352, at least one of a plurality of detection classes and linear data, the task inferring section 339 infers a task that is being carried out at a time point at which a captured image is obtained. Specifically, by inputting, to the implemented-task inference model 352, the at least one detection class that has been outputted by the index outputting section 332 and the linear data that has been extracted by the linear data extracting section 337, the task inferring section 339 infers the task that is presently being carried out. In this case, without reference to data in which the tasks that can be carried out in the waterworks construction, the combinations of the detection classes, and presence or absence of movement of the target object corresponding to the at least one detection class are associated with each other, the task inferring section 339 can infer the task that is presently being carried out. That is, in this case, the storage section 35 does not need to store the data.

The implemented-task inference model 352 is a trained model that is constructed, by machine learning, so as to infer the task that is being carried out at the time point at which the captured image is obtained. The index inference model 351 may be, for example, a neural network (e.g., convolutional neural network (CNN)) that includes at least an input layer, an intermediate layer, and an output layer.

In the implemented-task inference model 352, the input layer is a layer into which at least one of detection classes and linear data are inputted. The intermediate layer is a layer in which parameters have been learned on the basis of a plurality of detection classes, a plurality of pieces of linear data, and the contents of a plurality of tasks. The output layer is a layer that outputs a task in waterworks construction.

For example, data in which the content of a task as correct answer data is associated with each of the plurality of detection classes or a combination of detection classes is prepared as training data. The training data is prepared by associating, with the at least one detection class that is outputted by the index outputting section 332 on the basis of captured images of various task target regions, the contents of the task when each of the captured images is obtained. Further, for example, data in which the content of the task as the correct answer data is associated with each of the plurality of pieces of linear data is prepared as the training data. The training data is prepared by associating, with the linear data that is extracted by the linear data extracting section 337 on the basis of the captured images of the various task target regions, the content of the task when each of the captured images is obtained. The implemented-task inference model 352 is constructed by sequentially inputting training data and learning parameters (weights and biases) so as to minimize a loss function.

In a case where the at least one detection class and the linear data are inputted into the input layer, the implemented-task inference model 352 thus constructed causes a computer to function to output, from the output layer via an operation performed by the intermediate layer, the content of the task when each of the captured images is obtained. The at least one detection class that is inputted into the input layer is a result that has been inferred by the index outputting section 332 when each of the captured images is obtained. The linear data that is inputted into the input layer is a result that has been extracted by the linear data extracting section 337 when each of the captured images is obtained. Thus, by inputting, into the implemented-task inference model 352, the at least one detection class that is inputted into the input layer and the linear data that is inputted into the input layer, the task inferring section 339 can output the content of the task that is presently being carried out.

Note that the task inferring section 339 may use the output result (result of weighting) from the weighting processing section 338 to infer the task that is presently being carried out. For example, the implemented-task inference model 352 may be constructed with use of the output result from the weighting processing section 338. In this case, by inputting the output result to the implemented-task inference model 352, the task inferring section 339 may infer the task that is presently being carried out. Note that weighting is carried out, in an inferred detection class, with respect to the time period in which the linear data has been extracted. Thus, it may be understood that a concept of using the linear data in construction of the implemented-task inference model 352 and in task inference with use of the implemented-task inference model 352 includes using the result of weighting.

As described above, the task inferring section 339 uses the linear data to carry out task inference. Thus, the task inferring section 339 can infer, in consideration of movement of the target object, the task that is presently being carried out (task in operation). This enables the task inferring section 339 to precisely infer the task in operation.

Further, the task inferring section 339, which can identify a positional relationship between target objects (detection classes), can also infer, by analyzing magnitude of a slope that the linear data has, what movement a certain target object is carrying out with respect to another target object. The task inferring section 339 can also infer, for example, whether the backhoe is moving along the groove. This enables the task inferring section 339 to more precisely infer the task in operation. In a case where the implemented-task inference model 352 is used, by inputting the linear data and the at least one detection class, it is also inferred what movement a certain target object is carrying out with respect to another target object.

Further, the task management device 3, which can precisely infer the task in operation, can appropriately manage the waterworks construction. This enables the task management device 3 and the waterworks construction management system 1 that includes the task management device 3 to function to encourage promotion of inclusive and sustainable urbanization. Thus, the task management device 3 and the waterworks construction management system 1 can contribute to achievement of Sustainable Development Goals (SDGs).

In addition, in a case where the position identifying section 333 identifies a position of a detection class in a captured image, the task inferring section 339 may infer, on the basis of the position of the detection class, a task being carried out in each of different regions in the captured image. The task inferring section 339 may determine, in accordance with, for example, types of the detection classes inferred and positions of the detection classes identified, whether the captured image includes scenes in each of which waterworks construction is carried out. The task inferring section 339 which determines that the waterworks construction is carried out in each of the different regions in the captured image infers the task being carried out in each of the regions.

The display control section 340 controls the display device 4 so as to cause the display device 4 to display various pieces of information. In other words, the display control section 340 functions as an output section that outputs various pieces of information from the display device 4. The display control section 340 may output, from the display device 4, for example, an inference result (i.e., the content of a task) from the task inferring section 339. Further, the display control section 340 may output, from the display device 4, the time series data of the coordinates that has been generated by the data generating section 336. In this case, the display control section 340 may output, from the display device 4, for example, time series data of normalized coordinates. Moreover, the display control section 340 may output, from the display device 4, for example, time series data of coordinates that includes the linear data which has been extracted by the linear data extracting section 337. In this case, the display control section 340 may output, for example, a graph shown in the diagram indicated by the reference sign 502 in FIG. 5. Note that the display control section 340 may output, from the display device 4, the graph in which the time series data of the coordinates has been removed (graph showing only the linear data). In addition, the display control section 340 may output, from the display device 4, the result of weighting by the weighting processing section 338. The display control section 340 may output, for example, a graph shown in the diagram indicated by the reference sign 601 or the reference sign 602 in FIG. 6.

Furthermore, when outputting the content of the task to the display device 4, the display control section 340 may change display modes in a case where weighting is carried out (a case where the linear data is extracted) and a case where weighting is not carried out (a case where the linear data is not extracted). For example, the display control section 340 may change the color, shape, size, or the like of character strings indicative of the content of the task. Such a difference in display mode enables a manager and a worker (user) to understand that movement occurs in any of target objects included in the captured image.

In the present embodiment, the index outputting section 332 infers the at least one detection class with use of the index inference model 351, but may infer the at least one detection class without use of the index inference model 351. In this case, for example, data in which an image of a target object involved in waterworks construction and a name of the target object are associated with each other is stored in advance in the storage section 35. The index outputting section 332 uses a publicly-known imaging technology to extract an image of the target object from a captured image. The index outputting section 332 refers to the above data so as to identify a name of the target object extracted, i.e., a detection class.

Further, in the present embodiment, the task inferring section 339 infers a task with use of the implemented-task inference model 352, but may infer the task without use of the implemented-task inference model 352. In this case, for example, the task inferring section 339 stores, in the storage section 35 in advance as described earlier, data in which the respective contents of tasks that can be carried out in the waterworks construction, the combinations of the detection classes, and presence or absence of movement in the target object corresponding to the at least one detection class are associated with each other. Thus, in a case where the index outputting section 332 infers the at least one detection class and the linear data extracting section 337 extracts the linear data, the task inferring section 339 can infer the task in operation by referring to the above data.

<Coordinate Correction in Accordance with Camera Movement>

As described earlier, the camera 2 may be mounted on a movable object (the backhoe BH illustrated in FIG. 2). In this case, a positional relationship between the camera 2 and a target object is changed by movement of the camera 2. Thus, movement of the camera 2 changes a value of coordinates extracted by the data generating section 336. In a case where the camera 2 is stationary (in the case of a fixed point camera), an origin position that is set for each of captured images is a constant position with respect to a task target region whose image is to be captured. In contrast, in a case where the camera 2 is movable, the origin position that is set for each of the captured images is not the constant position with respect to the task target region whose image is to be captured. Thus, in a case where coordinates are extracted without considering movement of the camera 2, it may be impossible to evaluate, from the coordinates, actual presence or absence of movement of the target object. Thus, in a case where the camera 2 is movable, the data generating section 336 may correct, in consideration of movement of the camera 2, coordinates extracted from a captured image.

Figure 7:
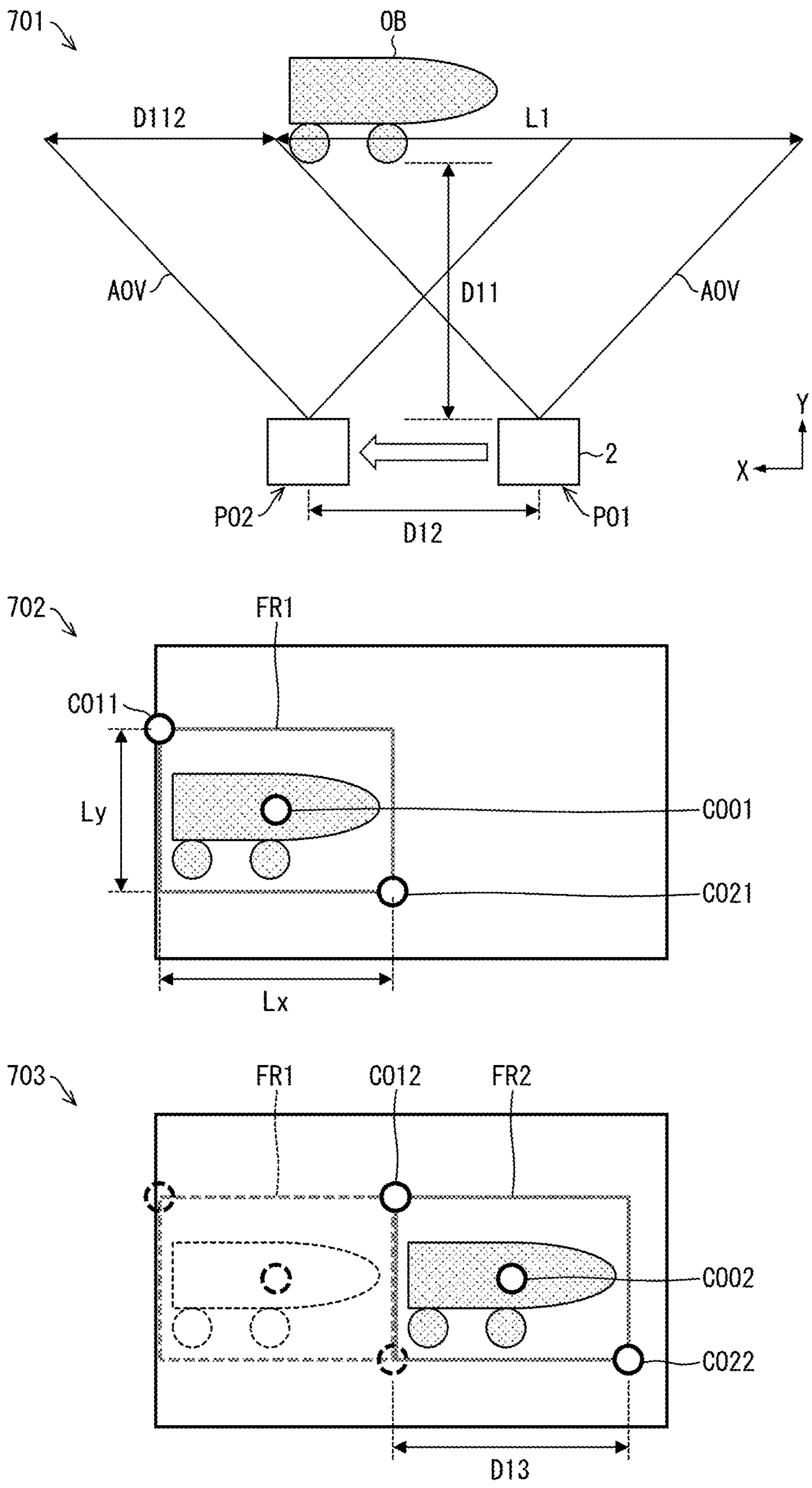
FIG. 7 is a diagram for describing correction of coordinates in a case where a camera that moves parallel to a target object captures an image of the target object.
Figure 8:
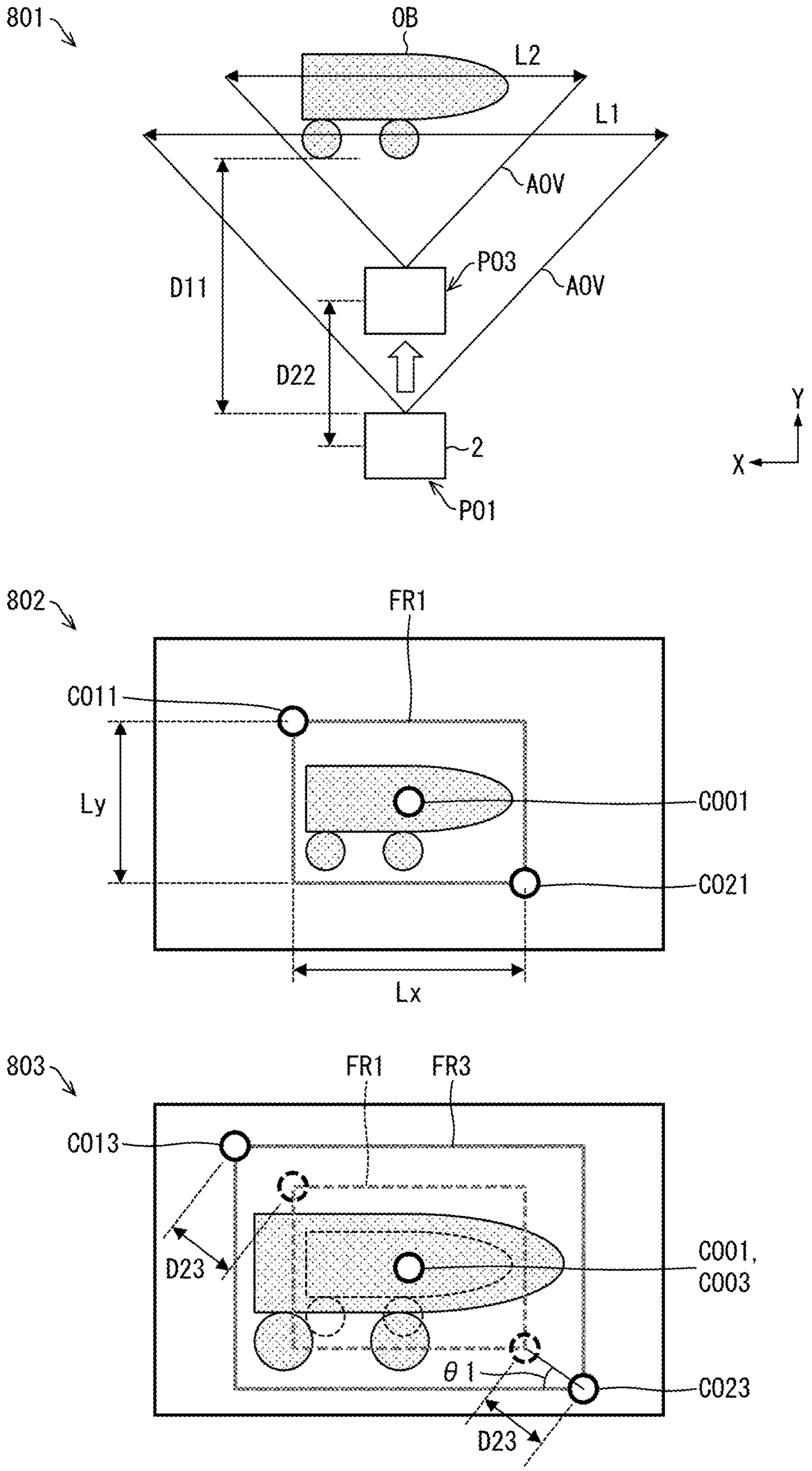
FIG. 8 is a diagram for describing correction of coordinates in a case where a camera that approaches a target object captures an image of the target object.

For example, on the basis of a predetermined reference position of the camera 2 and the position of the camera 2 when the captured image is obtained, the data generating section 336 may correct coordinates obtained from the captured image. FIGS. 7 and 8 are used to describe correction of coordinates on the basis of the reference position of the camera 2 and the position of the camera 2 when the captured image is obtained. FIG. 7 is a diagram for describing correction of coordinates in a case where the camera 2 that moves parallel to a target object captures an image of the target object. FIG. 8 is a diagram for describing correction of coordinates in a case where the camera 2 that approaches a target object captures an image of the target object. In FIG. 7 and FIG. 8, a reference sign AOV indicates an angle of view of the camera 2. Same applies to FIG. 9.

Note that description is based on the premise that the data generating section 336 obtains, from the camera 2, data indicative of the position of the camera 2 (absolute coordinates of the camera 2; GPS position information) and data indicative of the orientation of the camera 2. Furthermore, a standard size of a frame (e.g., a length of each of two adjacent sides or an area of the frame), the standard size being set for a target object in a case where the target object is separated by a unit distance from the camera 2, is predetermined for each target object. Moreover, a pixel-millimeter (mm) conversion value is also specified in advance.

(Coordinate Correction when Camera Moves in X-Axis Direction)

A diagram indicated by a reference sign 701 in FIG. 7 illustrates a state in which the camera 2 moves from a position PO1 to a position PO2. A diagram indicated by a reference sign 702 illustrates an example of a captured image that is obtained at the position PO1. A diagram indicated by a reference sign 703 illustrates an example of a captured image that is obtained at the position PO2. In the present example, the position PO1 corresponds to the reference position of the camera 2, and the position PO2 corresponds to the position of the camera 2 when the captured image is obtained.

First, the data generating section 336 identifies the absolute coordinates of the camera 2 at the position PO1. The data generating section 336 also identifies a distance D11, at the position PO1, from the camera 2 to a target object OB. As illustrated in the diagram indicated by the reference sign 702, the image obtaining section 331 obtains the captured image at the position PO1. With respect to the captured image, the frame setting section 335 sets a frame FR1 for an image of the target object OB and identifies coordinates CO01, coordinates CO11, and coordinates CO21. Further, lengths Lx and Ly of sides of the frame FR1 are identified. As described earlier, a standard size of the frame, the standard size being set for the target object OB, is predetermined. Thus, the data generating section 336 calculates the distance D11 (mm) from a ratio of the identified lengths of Lx and Ly to the standard size of the frame and from a unit distance between the target object OB and the camera 2.

Next, assume that the camera 2 has moved by a distance D12 (mm) parallel (in the X-axis direction) to the target object OB as illustrated in the diagram indicated by the reference sign 701. In this case, as in the diagram indicated by the reference sign 703, the image obtaining section 331 obtains the captured image at the position PO2. With respect to the captured image, the frame setting section 335 sets a frame FR2 for an image of the target object OB and identifies coordinates CO02, coordinates CO12, and coordinates CO22. In the captured image illustrated in the diagram indicated by the reference sign 703, the image of the target object OB which actually does not appear, the image having been captured at the position PO1, and the frame FR1 set for the image of the target object OB are illustrated for convenience of description (dashed line-enclosed parts). The data generating section 336 identifies the absolute coordinates of the camera 2 at the position PO2. The data generating section 336 calculates the distance D12 (mm) from the absolute coordinates of the camera 2 at each of the position PO1 and the position PO2.

Further, the data generating section 336 calculates, from the distance D11 (mm) and the distance D12 (mm), a movement distance D13 (pixel) from the frame FR1 to the frame FR2, the movement distance D13 corresponding to an amount of movement of the camera 2.

Note here that a total lateral length (referred to as a first image plane range) of the captured image at the position PO1 is assumed to be L1 (mm). A lateral direction corresponds to the X-axis direction. The first image plane range L1 (mm) can be calculated by a linear function $p \times D11$ (mm). p is a constant and is a value that is determined by an optical system (e.g., a size of a lens or an image sensor) of the camera 2 used. Note also that a movement distance (referred to as an image plane movement distance) of the target object OB in the captured image is assumed to be D112 (mm). The image plane movement distance D112 (mm) can be calculated by a linear function $1 \times D12$ (mm). Then, the movement distance D13 (pixel) can be calculated by (image plane movement distance D112 (mm)/first image plane range L1 (mm))×(total number of pixels (pixel) in lateral direction in captured image).

The data generating section 336 calculates the first image plane range L1 (mm) and calculates the image plane movement distance D112 (mm). The data generating section 336 calculates the movement distance D13 (pixel) from the first image plane range L1 (mm) and the image plane movement distance D112 (mm). Note that the total lateral length of the captured image at the position PO2 may be calculated instead of the first image plane range L1 (mm).

The data generating section 336 transforms each of the coordinates CO02, the coordinates CO12, and the coordinates CO22, by affine transformation with use of the movement distance D13 (pixel) in the X-axis direction, into coordinates in the captured image that is assumed to be obtained at the position PO1. Specifically, the data generating section 336 substitutes the movement distance D13 into Tx in Equation 1 below and substitutes 1 into Ty in Equation 1 below. Further, the data generating section 336 substitutes an x-coordinate and a y-coordinate of each of the coordinates CO02, the coordinates CO12, and the coordinates CO22 into respective x' and y' in Equation 1 below. This enables the data generating section 336 to obtain coordinates obtained by moving, by the movement distance D13 (pixel) corresponding to the amount of movement of the camera 2 in the X-axis direction, each of the coordinates CO02, the coordinates CO12, and the coordinates CO22. That is, the data generating section 336 can obtain coordinates in which the amount of movement of the camera 2 in the X-axis direction is offset.

$$\begin{pmatrix} x' \\ y' \\ 1 \end{pmatrix} = \begin{pmatrix} 1 & 0 & T_x \\ 0 & 1 & T_y \\ 0 & 0 & 1 \end{pmatrix} \begin{pmatrix} x \\ y \\ 1 \end{pmatrix} \quad \text{(Equation 1)}$$

(Coordinate Correction when Camera Moves in Y-Axis Direction)

A diagram indicated by a reference sign 801 in FIG. 8 illustrates a state in which the camera 2 moves from the position PO1 to a position PO3. A diagram indicated by a reference sign 802 illustrates an example of a captured image that is obtained at the position PO1. A diagram indicated by a reference sign 803 illustrates an example of a captured image that is obtained at the position PO3. In the present example, the position PO1 corresponds to the reference position of the camera 2, and the position PO3 corresponds to the position of the camera 2 when the captured image is obtained.

First, the data generating section 336 identifies the absolute coordinates of the camera 2 at the position PO1. The data generating section 336 also identifies a distance D11 (mm), at the position PO1, from the camera 2 to the target object OB.

Next, assume that the camera 2 has moved by a distance D22 (mm) (in the Y-axis direction) so as to approach the target object OB, as illustrated in the diagram indicated by the reference sign 801. In this case, as in the diagram indicated by the reference sign 803, the image obtaining section 331 obtains the captured image at the position PO2. With respect to the captured image, the frame setting section 335 sets a frame FR3 for an image of the target object OB and identifies coordinates CO03, coordinates CO13, and coordinates CO23. In the captured image illustrated in the diagram indicated by the reference sign 803, the image of the target object OB which actually does not appear, the image having been captured at the position PO1, and the frame FR1 set for the image of the target object OB are illustrated for convenience of description (dashed line-enclosed parts). The data generating section 336 identifies the absolute coordinates of the camera 2 at the position PO3. The data generating section 336 calculates the distance D22 (mm) from the absolute coordinates of the camera 2 at each of the position PO1 and the position PO3. Note that the data generating section 336 calculates a distance D11-D22 (mm) or the distance D22 (mm) from a ratio of the lengths Lx and Ly identified in the frame FR3 to the standard size of the frame and from the unit distance between the target object OB and the camera 2.

Note here that the total lateral length (referred to as the first image plane range) of the captured image at the position PO1 is assumed to be L1 (mm). The first image plane range L1 (mm) can be calculated by the linear function p×D11 (mm). A total lateral length (referred to as a second image plane range) of the captured image at the position PO3 is assumed to be L2 (mm). The second image plane range L2 (mm) can be calculated by a linear function p×(D11-D22) (mm).

The data generating section 336 calculates the first image plane range L1 (mm) and the second image plane range L2 (mm). The data generating section 336 transforms each of the coordinates CO03, the coordinates CO13, and the coordinates CO23, by affine transformation with use of a ratio between the first image plane range L1 (mm) and the second image plane range L2 (mm), into coordinates in the captured image that is assumed to be obtained at the position PO1. Specifically, the data generating section 336 substitutes a ratio of (first image plane range L1 (mm)/second image plane range L2 (mm)) into each of Sx and Sy in Equation 2 below. Further, the data generating section 336 substitutes an x-coordinate and a y-coordinate of each of the coordinates CO03, the coordinates CO13, and the coordinates CO23 into respective x' and y' in Equation 2 below. This enables the data generating section 336 to obtain coordinates in which the amount of movement of the camera 2 in the Y-axis direction is offset.

$$\begin{pmatrix} x' \\ y' \\ 1 \end{pmatrix} = \begin{pmatrix} S_x & 0 & 0 \\ 0 & S_y & 0 \\ 0 & 0 & 1 \end{pmatrix} \begin{pmatrix} x \\ y \\ 1 \end{pmatrix} \quad \text{(Equation 2)}$$

Note that a movement distance D23 (pixel) can be calculated by (Lx (pixel)−Lx" (pixel))/2 cos θ1. In the above equation, Lx represents the number of pixels that corresponds to the length of a lateral side of the frame FR3, and Lx" refers to the total number of pixels in the lateral direction in the captured image. Further, θ1 is predetermined for each target object. By carrying out affine transformation, the data generating section 336 obtains coordinates obtained by moving each of the coordinates CO03, the coordinates CO13, and the coordinates CO23 by the movement distance D23 (pixel). Note that the data generating section 336 may use the movement distance D23 to transform each of the coordinates CO03, the coordinates CO13, and the coordinates CO23 into coordinates in the captured image that is assumed to be obtained at the position PO1.

(Coordinate Correction when Camera 2 Rotates)

Figure 9:
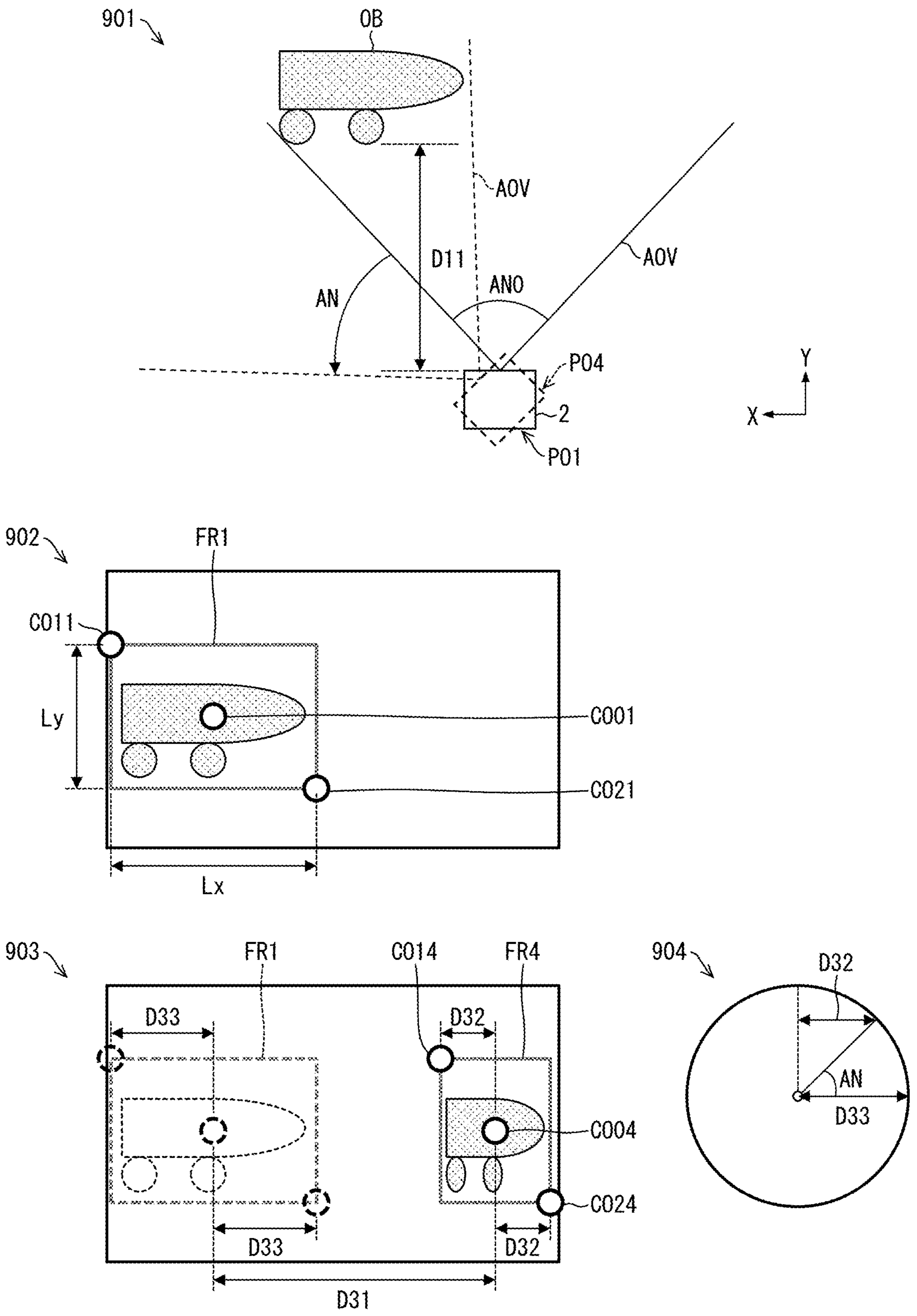
FIG. 9 is a diagram for describing correction of coordinates in a case where an image of a target object is captured when a camera rotates around a vertical direction.

On the basis of an angle between a predetermined reference image capture direction of the camera 2 and an image capture direction of the camera 2 when the captured image is obtained, the data generating section 336 may correct coordinates obtained from the captured image. Correction of the coordinates on the basis of the angle will be described with reference to FIG. 9. FIG. 9 is a diagram for describing correction of coordinates in a case where an image of a target object is captured when the camera 2 rotates around a vertical direction.

A diagram indicated by a reference sign 901 in FIG. 9 illustrates a state in which the camera 2 rotates from the position PO1 to a position PO4. A diagram indicated by a reference sign 902 illustrates an example of a captured image that is obtained at the position PO1. A diagram indicated by a reference sign 903 illustrates an example of a captured image that is obtained at the position PO4. In the present example, the image capture direction at the position PO1 corresponds to the reference image capture direction of the camera 2, and the image capture direction at the position PO4 corresponds to the image capture direction of the camera 2 when the captured image is obtained. A diagram indicated by a reference sign 904 illustrates an example of a relationship between a distance D32 and a distance D33.

First, the data generating section 336 identifies the absolute coordinates of the camera 2 at the position PO1. The data generating section 336 also identifies the distance D11 (mm), at the position PO1, from the camera 2 to the target object OB.

Next, it is assumed that the camera 2 that was in a state at the position PO1 has been rotated by an angle AN (deg), as illustrated in the diagram indicated by the reference sign 901. In this case, as in the diagram indicated by the reference sign 903, the image obtaining section 331 obtains the captured image at the position PO4. With respect to the captured image, the frame setting section 335 sets a frame FR4 for an image of the target object OB and identifies coordinates CO04, coordinates CO14, and coordinates CO24. In the captured image illustrated in the diagram indicated by the reference sign 903, the image of the target object OB which actually does not appear, the image having been captured at the position PO1, and the frame FR1 set for the image of the target object OB are illustrated for convenience of description (dashed line-enclosed parts).

It is assumed here that D33 is a distance in the lateral direction (corresponding to the X-axis direction) between the coordinates CO01 and the coordinates CO11 or the coordinates CO21 in the frame FR1. It is also assumed that D32 is a distance in the lateral direction (corresponding to the X-axis direction) between the coordinates CO04 and the coordinates CO14 or the coordinates CO24 in the frame FR4. In this case, the distance D32 can be calculated as the distance D33×Cos AN as illustrated in the diagram indicated by the reference sign 904. That is, a degree of reduction from the frame FR1 to the frame FR4 in accordance with rotation of the camera 2 by the angle AN (deg) can be expressed as Cos AN.

This enables the data generating section 336 to transform a size of the frame FR4 into a size of the frame FR1 by affine transformation with use of CosAN. Specifically, the data generating section 336 substitutes CosAN into Sx in Equation 2 above and substitutes 1 into Sy in Equation 2 above. Further, the data generating section 336 substitutes an x-coordinate and a y-coordinate of each of the coordinates CO14 and the coordinates CO24 into respective x' and y' in Equation 2 above. This enables the data generating section 336 to obtain coordinates obtained by transforming the size of the frame FR4 into the size of the frame FR1.

It is assumed that D31 is a distance between the coordinates CO01 (center coordinates) of the frame FR1 and the coordinates CO04 (center coordinates) of the frame FR4. A position of the frame FR4 can be transformed into a position of the frame FR1 by being moved by the distance D31. An amount of parallel translation from the frame FR1 to the frame FR4 in accordance with rotation of the camera 2 by the angle AN (deg) can be calculated by (angle AN (deg)/angle of view AN0)×(total number of pixels in lateral direction in captured image).

The data generating section 336 can transform the position of the frame FR4 into the position of the frame FR1 by affine transformation with use of the above amount of parallel translation. Specifically, the data generating section 336 calculates the amount of parallel translation. The data generating section 336 substitutes the amount of parallel translation into Tx in Equation 1 above and substitutes 1 into Ty in Equation 1 above. Further, the data generating section 336 substitutes the x-coordinate and the y-coordinate of each of the coordinates CO14 and the coordinates CO24 into respective x' and y' in Equation 1 above. This enables the data generating section 336 to obtain coordinates obtained by transforming the position of the frame FR4 into the position of the frame FR1.

As described above, by carrying out the above two types of affine transformation, the data generating section 336 can transform each of the coordinates CO04, the coordinates CO14, and the coordinates CO24 into coordinates in the captured image that is assumed to be obtained at the position PO1. That is, the data generating section 336 can obtain coordinates in which an amount of rotation of the camera 2 is offset.

As described above, the data generating section 336 transforms the coordinates in each of movement of the camera 2 in the X-axis direction, movement of the camera 2 in the Y-axis direction, and rotation of the camera 2. This enables the data generating section 336 to transform, into a value of coordinates that is extracted in a captured image which is assumed to be obtained at each of the reference position and the reference image capture direction, coordinates extracted from each of all obtained captured images.

[Process in Task Management Device]

Figure 10:
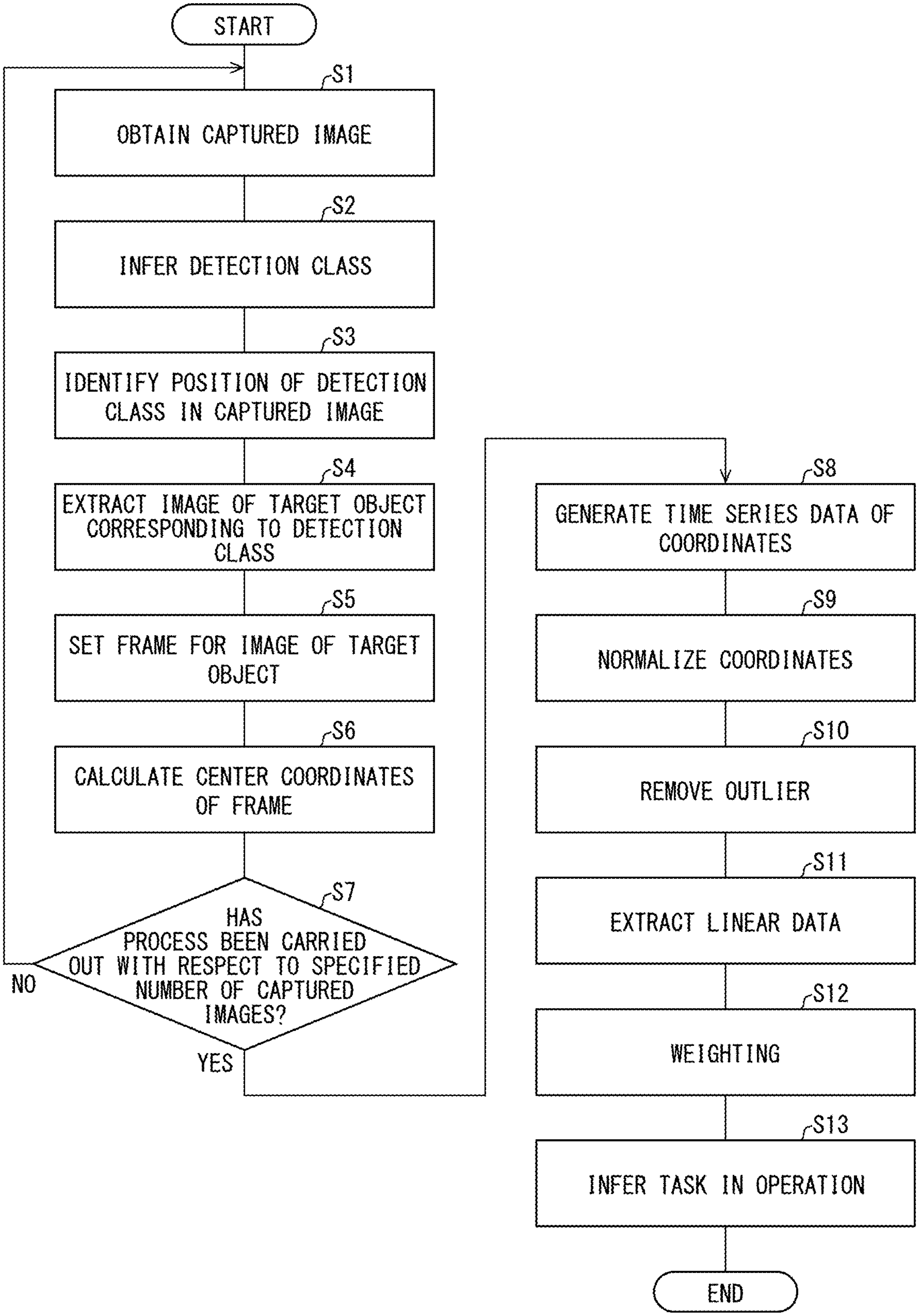
FIG. 10 is a flowchart showing an example of a process in a task management device.

FIG. 10 is a flowchart showing an example of a process (task management method) in the task management device 3. As shown in FIG. 10, the image obtaining section 331 obtains a captured image from the camera 2 (S1: an image obtaining step). The index outputting section 332 inputs, to the index inference model 351, the captured image that has been obtained by the image obtaining section 331. The index outputting section 332 outputs an inferred detection class as an output result from the index inference model 351. In other words, the index outputting section 332 infers a detection class that is included in the captured image (S2).

The position identifying section 333 identifies, in the captured image, a position of the detection class that has been outputted by the index outputting section 332 (S3). In a case where the position identifying section 333 identifies a plurality of positions of detection classes, the control section 33 determines, on the basis of a positional relationship between the detection classes, whether the captured image includes scenes in each of which waterworks construction is carried out. In other words, the control section 33 determines whether the waterworks construction is carried out in each of different regions in the captured image. The control section 33 which determines that the waterworks construction is carried out in each of the different regions in the captured image carries out the subsequent process for each of the regions.

The image extracting section 334 extracts, from the captured image obtained by the image obtaining section 331, an image of a target object involved in the waterworks construction (S4: an image extracting step). In the present embodiment, the image of the target object that corresponds to the detection class which has been outputted by the index outputting section 332 is extracted.

The frame setting section 335 sets, for the image of the target object, the image having been extracted by the image extracting section 334, a frame that is in accordance with a size of the image of the target object (S5). The data generating section 336 calculates center coordinates of the frame as coordinates of a position predetermined in the frame set by the frame setting section 335 (S6). That is, in S5 and S6, the data generating section 336 extracts coordinates in a region containing the image of the target object, the image having been extracted by the image extracting section 334.

The camera 2 captures images of a task target region over time. Thus, the image obtaining section 331 obtains captured images from the camera 2 over time. Thus, the control section 33 sequentially carries out the process in S2 to S6 with respect to the captured images that have been obtained by the image obtaining section 331.

After the process in S6, the control section 33 determines whether the process in S2 to S6 has been carried out for the specified number of captured images (S7). The control section 33 returns to the process in S1 in a case where the number of captured images that have been subjected to the process in S2 to S6 is less than the specified number (NO in S7). In contrast, in a case where the control section 33 determines that the process in S2 to S6 has been carried out with respect to the specified number of captured images (YES in S7), the data generating section 336 generates time series data of the extracted coordinates (S8: a data generating step). In the present embodiment, the data generating section 336 generates time series data of the center coordinates of the frame.

In the case of YES in S7, coordinates are extracted over time for a target object whose image has been extracted by the image extracting section 334. This enables the data generating section 336 to generate time series data of the extracted coordinates for the target object. In addition, in a case where a plurality of images of the target object that corresponds to the detection class are present in a captured image, the image extracting section 334 extracts an image for each target object. This enables the data generating section 336 to generate time series data of coordinates for each target object. In the present embodiment, the data generating section 336 generates time series data of an X-coordinate of the extracted center coordinates and time series data of a Y-coordinate of the extracted center coordinates.

Note that the above specified number only needs to be specified provided that the data generating section 336 can generate time series data of coordinates and that the linear data extracting section 337 can extract significant linear data in the process in a later stage S11. The specified number is, for example, the number of captured images that have been obtained in five minutes by the image obtaining section 331. For example, in a case where the image obtaining section 331 obtains one captured image per second, the number of captured images is 18,000 (=5 (minutes)×60×60).

The data generating section 336 normalizes coordinates for the generated time series data of the coordinates (S9). Note that the process in S9 may be carried out during the process in S6 to S8. The data generating section 336 removes an outlier in the time series data of the normalized coordinates (S10). The linear data extracting section 337 extracts linear data from the time series data of the coordinates in which time series data the data generating section 336 has removed the outlier (S11: a linear data extracting step). The weighting processing section 338 assigns more weights to a time period in which the linear data extracting section 337 has extracted the linear data than to a time period other than the above time period (S12). The control section 33 carries out the process in S9 to S12 with respect to the time series data of the coordinates of each target object. Further, the control section 33 carries out the process in S9 to S12 with respect to each of the time series data of the X-coordinate and the time series data of the Y-coordinate.

Thereafter, on the basis of the linear data that has been extracted by the linear data extracting section 337 and a target object that is included in a captured image, the task inferring section 339 infers, as a task in operation, a task that is being carried out at a time point at which the captured image is obtained (S13: a task inferring step). In the present embodiment, the task inferring section 339 infers the task in operation by inputting, to the implemented-task inference model 352, the detection class that has been outputted by the index outputting section 332 and that corresponds to the target object and the linear data that has been extracted by the linear data extracting section 337. Note that the task inferring section 339 may infer the task in operation on the basis of the result of weighting by the weighting processing section 338 and the target object that is included in the captured image.

The display control section 340 displays, on the display device 4, an inference result from the task inferring section 339. The display control section 340 may display, on the display device 4, not only the inference result but also, for example, time series data (that may include linear data) of coordinates for each target object and a result of weighting for each target object. In a case where it is determined that the waterworks construction is carried out in each of the different regions in the captured image, the display control section 340 may display, on the display device 4, the above various data for each of the regions.

[Software Implementation Example]

A function of the task management device 3 (hereinafter referred to as "device") can be realized by a program for causing a computer to function as the device, the program causing the computer to function as control blocks (in particular, sections provided in the control section 33) of the device.

In this case, the device includes, as hardware for executing the program, a computer that has at least one control device (e.g., processor) and at least one storage device (e.g., memory). The functions described in the embodiments are realized by executing the program by the control device and the storage device.

The program may be stored in at least one non-transitory computer-readable storage medium. The storage medium may or may not be provided in the device. In the latter case, the program may be made available to the device via any wired or wireless transmission medium.

Further, some or all of functions of the control blocks can be realized by a logic circuit. For example, the present invention encompasses, in its scope, an integrated circuit in which a logic circuit that functions as the control blocks is formed. In addition, the functions of the control blocks can be realized by, for example, a quantum computer.

Aspects of the present invention can also be expressed as follows:

In order to attain the object, a task management device in accordance with a first aspect of the present invention includes: an image obtaining section configured to obtain, over time, captured images each including a task target region in waterworks construction; an image extracting section configured to extract, from each of the captured images that have been obtained over time, an image of at least one target object which is involved in the waterworks construction; a data generating section configured to, for each image of the at least one object that is inferred to be identical in each of the captured images, by extracting over time coordinates in a region containing the each image, generate time series data of the coordinates; a linear data extracting section configured to extract, from the time series data of the coordinates, linear data that is a part in which a value is continuously and regularly changed; and a task inferring section configured to infer, on the basis of the linear data and the image of the at least one target object, the image being included in each of the captured images, a task being carried out at a time point at which each of the captured images is obtained.

In order to attain the object, a task management method in accordance with a tenth aspect of the present invention includes: an image obtaining step of obtaining, over time, captured images each including a task target region in waterworks construction; an image extracting step of extracting, from each of the captured images that have been obtained over time, an image of at least one target object which is involved in the waterworks construction; a data generating step of, for each image of the at least one object that is inferred to be identical in each of the captured images, by extracting over time coordinates in a region containing the each image, generating time series data of the coordinates; a linear data extracting step of extracting, from the time series data of the coordinates, linear data that is a part in which a value is continuously and regularly changed; and a task inferring step of inferring, on the basis of the linear data and the at least one target object from which the time series data of the coordinates from which time series data the linear data has been extracted is generated, a task being carried out at a time point at which each of the captured images is obtained.

It can be said that a part in which a value is continuously and regularly changed in time series data of coordinates indicates that a target object from which the time series data of the coordinates is generated moves in a time period in which the part has been extracted.

Thus, according to the above-described configuration, by also using linear data to infer a task in operation on the basis of a target object included in a captured image, the task management device can infer the task in consideration of movement of the target object in the time period. This enables the task management device to infer the task in operation with higher accuracy.

In a second aspect of the present invention, a task management device may be configured to, in the first aspect, further include a frame setting section configured to set, around the image of the at least one target object or around a part of the image of the at least one target object, a frame that is in accordance with a size of the image of the at least one target object, the data generating section extracting, as the coordinates in the region, coordinates of a position predetermined in the frame.

According to the above-described configuration, the task management device can easily extract coordinates in a region of the extracted image of the target object.

In a third aspect of the present invention, a task management device may be configured such that, in the first or second aspect, the data generating section normalizes the coordinates with use of a size of the image of the at least one target object from which image the coordinates have been extracted.

The size of the image of the target object depends on a position in the captured image. According to the above-described configuration, by normalizing the coordinates by the size of the image of the target object from which image the coordinates have been extracted, the task management device can extract the coordinates with the possibility of being affected by a distance from the captured image reduced.

In a fourth aspect of the present invention, a task management device may be configured such that, in any one of the first to third aspects, the data generating section removes an outlier from the time series data of the coordinates, and the linear data extracting section extracts the linear data from the time series data of the coordinates from which time series data the outlier has been removed.

According to the above-described configuration, the task management device can extract linear data more accurately.

In a fifth aspect of the present invention, a task management device may be configured to, in any one of the first to fourth aspects, further include an index outputting section configured to output at least one index that is inferred to appear in the task at the time point at which each of the captured images is obtained, the at least one index being inferred by inputting each of the captured images to an index inference model that is among a plurality of indices, including the at least one target object, for evaluating a task state in the waterworks construction and that is constructed, by machine learning, so as to infer at least one index that appears in a task at a specified time point, the task inferring section inferring, on the basis of the linear data and an output result from the index outputting section, the task being carried out at the time point at which each of the captured images is obtained.

According to the above-described configuration, by inputting each of the captured images to the index inference model, the task management device can infer a combination of indices (target objects) at the time point at which each of the captured images is obtained. This makes it possible to infer a task in operation on the basis of the inferred combination of indices.

In a sixth aspect of the present invention, a task management device may be configured to, in the fifth aspect, further include a weighting processing section configured to, in a case where the linear data extracting section extracts the linear data, in the at least one index that has been output as the at least one target object from which the time series data of the coordinates from which time series data the linear data has been extracted is generated, assign more weights to a time period in which the linear data has been extracted than to another time period different from the time period, assuming that movement occurs in the at least one target object.

According to the above-described configuration, in an index (target object) that has been outputted from the index inference model, the task management device can assign more weights to a time period in which movement occurs than a time period other than the above time period.

In a seventh aspect of the present invention, a task management device may be configured to, in any one of the first to sixth aspects, further include a camera configured to capture an image of the task target region, the data generating section correcting the coordinates on the basis of a predetermined reference position of the camera and a position of the camera when each of the captured images is obtained.

According to the above-described configuration, the task management device can generate time series data of coordinates in a state in which camera movement less influences extraction of coordinates, i.e., under a condition substantially identical to a condition under which an image is captured with use of a fixed camera.

In an eighth aspect of the present invention, a task management device may be configured such that, in any one of the first to seventh aspects, the task inferring section infers the task being carried out at the time point at which each of the captured images is obtained, the task being inferred by inputting (i) at least one of a plurality of indices, including the at least one target object, for evaluating a task state in the waterworks construction and (ii) the linear data to an implemented-task inference model that is constructed, by machine learning, so as to infer the task being carried out at the time point at which each of the captured images is obtained.

According to the above-described configuration, the task management device can infer a task in operation by inputting an index (target object) and linear data to the implemented-task inference model. This enables the task management device to infer a task with much higher accuracy.

In a ninth aspect of the present invention, a task management device may be configured to, in any one of the first to eighth aspects, further include an output section that is connected with a notification section so as to be capable of communicating with the notification section and that outputs, from the notification section, at least one of an inference result from the task inferring section and the time series data of the coordinates.

According to the above-described configuration, the task management device can present, to a user, at least one of an inference result from the task inferring section and the time series data of the coordinates.

In order to attain the object, an implemented-task inference model in accordance with an eleventh aspect of the present invention includes: an input layer into which (i) at least one of a plurality of indices for evaluating a task state in waterworks construction and (ii) linear data are inputted, the linear data being extracted as a result of obtaining, over time, captured images each including a task target region in waterworks construction, and being a part in which a value is continuously and regularly changed in time series data of coordinates included in an image of a target object that is included in the captured images and that is one of the plurality of indices; an output layer which outputs at least one task in the waterworks construction; and an intermediate layer in which parameters have been learned on the basis of the plurality of indices, a plurality of pieces of the linear data, and a plurality of tasks that the at least one task comprises, in a case where the at least one of the plurality of indices and the linear data are inputted into the input layer, the implemented-task inference model causing a computer to function to output, from the output layer via an operation performed by the intermediate layer, a task being carried out at a time point at which each of the captured images is obtained.

According to the above-described configuration, the task management device can infer a task in operation by inputting an index (target object) and linear data to the implemented-task inference model.

ADDITIONAL REMARKS

The present invention is not limited to the embodiments, but can be altered by a skilled person in the art within the scope of the claims. The present invention also encompasses, in its technical scope, any embodiment derived by combining technical 1 means disclosed in differing embodiments.

REFERENCE SIGNS LIST

3 Task management device
2 Camera
4 Display device (notification section)
331 Image obtaining section
332 Index outputting section
334 Image extracting section
336 Data generating section
337 Linear data extracting section
338 Weighting processing section
339 Task inferring section
335 Frame setting section
340 Display control section (output section)
351 Index inference model
352 Implemented-task inference model

The invention claimed is:

1. A task management device comprising at least one processor for executing a function of each section of the task management device, the at least one processor including:

an image obtaining section configured to obtain, over time, captured images each including a task target region in waterworks construction;

an image extracting section configured to extract, from each of the captured images that have been obtained over time, an image of at least one target object which is involved in the waterworks construction;

a data generating section configured to, for each image of the at least one object that is inferred to be identical in each of the captured images, by extracting over time coordinates in a region containing the each image, generate time series data of the coordinates;

a linear data extracting section configured to extract, from the time series data of the coordinates, linear data that is a part in which a value is continuously and regularly changed;

a task inferring section configured to infer, on the basis of the linear data and the image of the at least one target object, the image being included in each of the captured images, a task being carried out at a time point at which each of the captured images is obtained; and an index outputting section configured to output at least one index that is inferred to appear in the task at the time point at which each of the captured images is obtained, the at least one index being inferred by inputting each of the captured images to an index inference model that is among a plurality of indices, including the at least one target object, for evaluating a task state in the waterworks construction and that is constructed, by machine learning, so as to infer at least one index that appears in a task at a specified time point, the task inferring section inferring, on the basis of the linear data and an output result from the index outputting section, the task being carried out at the time point at which each of the captured images is obtained, and the at least one processor further including a weight processing section configured to, in a case where the linear data extracting section extracts the linear data, in the at least one index that has been output as the at least one target object from which the time series data of the coordinates from which time series data the linear data has been extracted is generated, assign more weights to a time period during which movement of the at least one target object occurs and in which the linear data has been extracted than to another time period different from the time period, assuming that movement occurs in the at least one target object and determine the task is being carried out.

2. The task management device according to claim 1, further comprising a frame setting section configured to set, around the image of the at least one target object or around a part of the image of the at least one target object, a frame that is in accordance with a size of the image of the at least one target object, the data generating section extracting, as the coordinates in the region, coordinates of a position predetermined in the frame.

3. The task management device according to claim 1, wherein the data generating section normalizes the coordinates with use of a size of the image of the at least one target object from which image the coordinates have been extracted.

4. The task management device according to claim 1, wherein the data generating section removes an outlier from the time series data of the coordinates, and the linear data extracting section extracts the linear data from the time series data of the coordinates from which time series data the outlier has been removed.

5. The task management device according to claim 1, further comprising a camera configured to capture an image of the task target region, the data generating section correcting the coordinates on the basis of a predetermined reference position of the camera and a position of the camera when each of the captured images is obtained.

6. The task management device according to claim 1, wherein the task inferring section infers the task being carried out at the time point at which each of the captured images is obtained, the task being inferred by inputting (i) at least one of a plurality of indices, including the at least one target object, for evaluating a task state in the waterworks construction and (ii) the linear data to an implemented-task inference model that is constructed, by machine learning, so as to infer the task being carried out at the time point at which each of the captured images is obtained.

7. The task management device according to claim 1, further comprising an output section that is connected with a notification section so as to be capable of communicating with the notification section and that outputs, from the notification section, at least one of an inference result from the task inferring section and the time series data of the coordinates.

8. A task management method comprising:

an image obtaining step of obtaining, over time, captured images each including a task target region in waterworks construction;

an image extracting step of extracting, from each of the captured images that have been obtained over time, an image of at least one target object which is involved in the waterworks construction;

a data generating step of, for each image of the at least one object that is inferred to be identical in each of the captured images, by extracting over time coordinates in a region containing the each image, generating time series data of the coordinates;

a linear data extracting step of extracting, from the time series data of the coordinates, linear data that is a part in which a value is continuously and regularly changed;

a task inferring step of inferring, on the basis of the linear data and the at least one target object from which the time series data of the coordinates from which time series data the linear data has been extracted is generated, a task being carried out at a time point at which each of the captured images is obtained; and an index outputting step of outputting at least one index that is inferred to appear in the task at the time point at which each of the captured images is obtained, the at least one index being inferred by inputting each of the captured images to an index inference model that is among a plurality of indices, including the at least one target object, for evaluating a task state in the waterworks construction and that is constructed, by machine learning, so as to infer at least one index that appears in a task at a specified time point, wherein in the task inferring step, the task being carried out at the time point at which each of the captured images is obtained is inferred on the basis of the linear data and an output result in the index outputting step, the task management method further comprising a weighting processing step of, in a case where the linear data is extracted in the linear data extracting step, in the at least one index that has been output as the at least one target object from which the time series data of the coordinates from which time series data the linear data has been extracted is generated, assigning more weights to a time period during which movement of the at least one target object occurs and in which the linear data has been extracted than to another time period different from the time period, assuming that movement occurs in the at least one target object and determine the task is being carried out.

* * * * *